(12) United States Patent
Kim et al.

(10) Patent No.: US 12,457,432 B2
(45) Date of Patent: Oct. 28, 2025

(54) TOF SENSOR INCLUDING DUEL EMITTING UNITS AND METHOD FOR CONTROLLING THEREOF

(71) Applicant: SAMSUNG ELECTRONICS CO., LTD., Suwon-si (KR)

(72) Inventors: Jihye Kim, Suwon-si (KR); Jinpyo Gwak, Suwon-si (KR); Dongeui Shin, Suwon-si (KR); Hyunseok Hong, Suwon-si (KR); Minsu Hwangbo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 18/532,244

(22) Filed: Dec. 7, 2023

(65) Prior Publication Data
US 2024/0214701 A1 Jun. 27, 2024

Related U.S. Application Data

(63) Continuation of application No. PCT/KR2023/018179, filed on Nov. 13, 2023.

(30) Foreign Application Priority Data

Dec. 23, 2022 (KR) .................. 10-2022-0183247

(51) Int. Cl.
*H04N 25/50* (2023.01)
*H04N 25/706* (2023.01)

(52) U.S. Cl.
CPC ........... *H04N 25/50* (2023.01); *H04N 25/706* (2023.01)

(58) Field of Classification Search
CPC .... H04N 25/50; H04N 25/706; G01S 17/894; G01S 7/4865
See application file for complete search history.

(56) References Cited

U.S. PATENT DOCUMENTS 9,921,312 B2 * 3/2018 Takano ................... G01S 7/484
10,250,820 B2 4/2019 Choi et al.
(Continued)

FOREIGN PATENT DOCUMENTS

| KR | 10-1578878 B1 | 12/2015 |
| KR | 10-1749900 B1 | 6/2017 |
| KR | 10-2017-0125604 A | 11/2017 |
| KR | 10-2050632 B1 | 12/2019 |

(Continued)

OTHER PUBLICATIONS

International Search Report (PCT/ISA/210) dated Feb. 20, 2024, issued by the International Searching Authority in International Application No. PCT/KR2023/018179.
(Continued)

*Primary Examiner* — Gevell V Selby
(74) *Attorney, Agent, or Firm* — Sughrue Mion, PLLC

(57) ABSTRACT

Provided is a time of flight (ToF) sensor and a method for controlling the ToF sensor. The ToF sensor includes a first light emitter configured to output first light of a first pattern, a second light emitter configured to output second light of a second pattern, an image sensor including a plurality of pixels, and at least one processor configured to control the first light emitter and the second light emitter to sequentially output the first light and the second light, obtain, based on the output first light and second light being received through the image sensor by being reflected by a plurality of objects, a first image frame corresponding to the received first light and a second image frame corresponding to the received second light, and identify distances between the ToF sensor and the plurality of objects based on the first image frame and the second image frame.

14 Claims, 12 Drawing Sheets

(56) References Cited

U.S. PATENT DOCUMENTS

| | | | |
|---|---|---|---|
| 10,607,352 | B2 | 3/2020 | Ortiz Egea et al. |
| 11,579,254 | B2 | 2/2023 | Jeong et al. |
| 11,669,935 | B2 | 6/2023 | Kim |
| 12,146,955 | B2 | 11/2024 | Kato et al. |
| 2014/0263953 | A1 | 9/2014 | Wang et al. |
| 2017/0084033 | A1* | 3/2017 | Blonde .................. G06T 5/73 |
| 2017/0324909 | A1 | 11/2017 | Choi et al. |
| 2018/0315166 | A1 | 11/2018 | Noyes et al. |
| 2020/0162655 | A1 | 5/2020 | Zhou et al. |
| 2021/0181349 | A1 | 6/2021 | Lee et al. |
| 2022/0301105 | A1 | 9/2022 | Kim |
| 2023/0185308 | A1 | 6/2023 | Hwangbo et al. |
| 2023/0204957 | A1* | 6/2023 | Jeong .................. H04N 23/74 345/8 |

FOREIGN PATENT DOCUMENTS

| | | |
|---|---|---|
| KR | 10-2021-0074153 A | 6/2021 |
| KR | 10-2021-0138451 A | 11/2021 |
| KR | 10-2330919 B1 | 12/2021 |
| KR | 10-2022-0019930 A | 2/2022 |
| KR | 10-2022-0131054 A | 9/2022 |

OTHER PUBLICATIONS

Written Opinion (PCT/ISA/237) dated Feb. 20, 2024, issued by the International Searching Authority in International Application No. PCT/KR2023/018179.

"3D Sensing: VCSEL Laser Illumination", Jan. 22, 2021, 6 pages, [https://4sense.medium.com/3d-sensing-intro-of-vclse-illumination-ab520f233a2].

* cited by examiner

FIG. 8
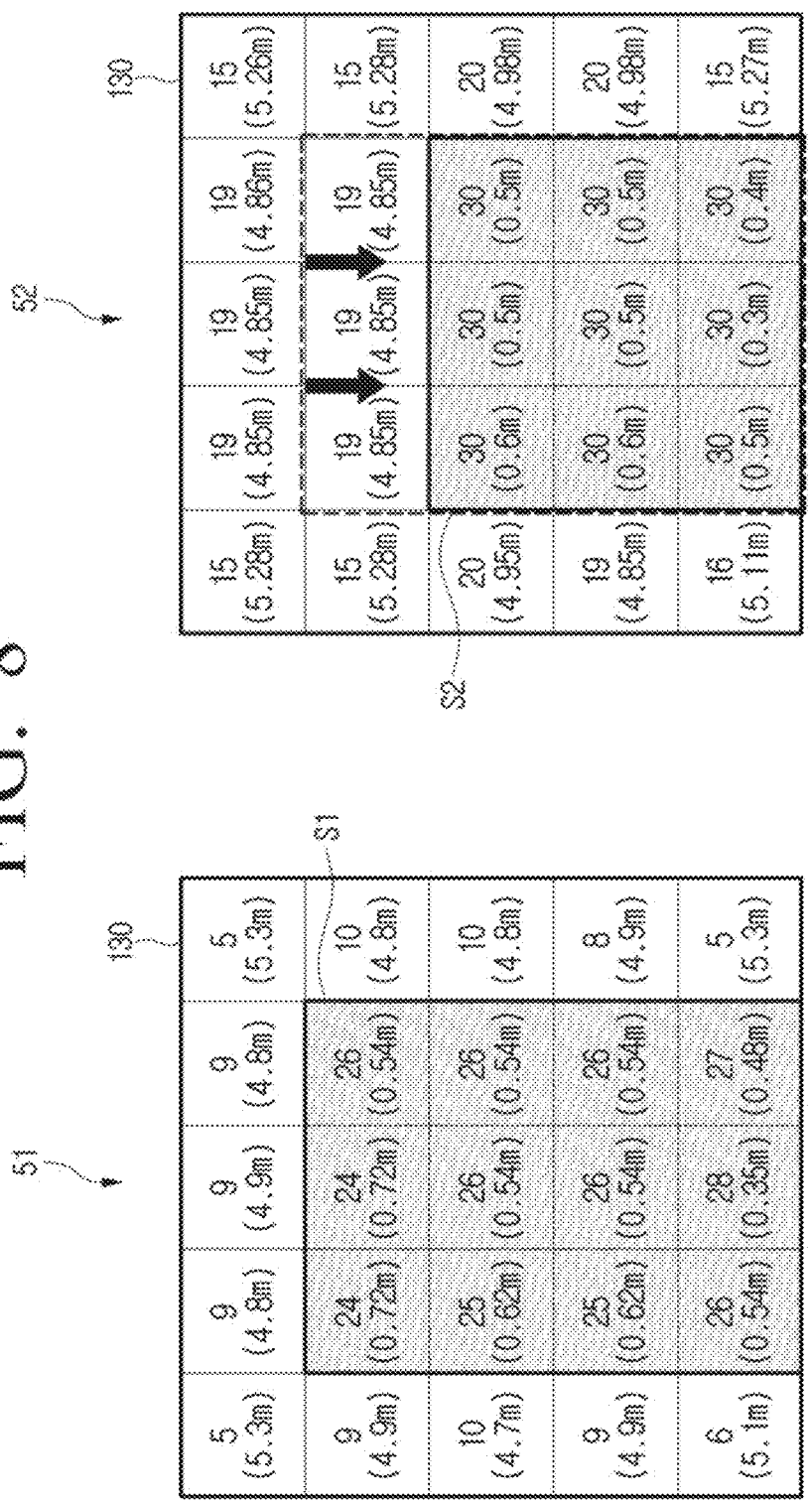
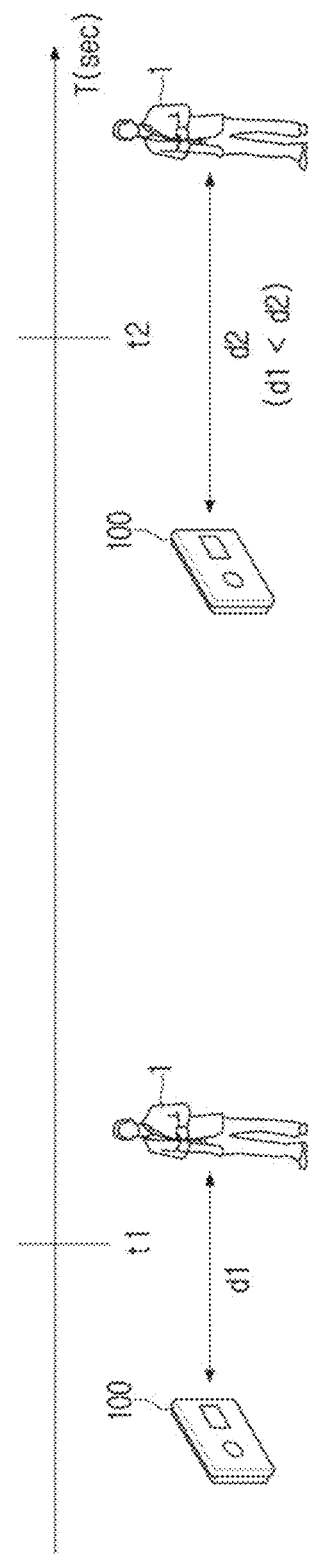

TOF SENSOR INCLUDING DUEL EMITTING UNITS AND METHOD FOR CONTROLLING THEREOF

CROSS-REFERENCE TO RELATED APPLICATIONS

This application is a continuation application of International Application No. PCT/KR2023/018179, filed on Nov. 13, 2023, which claims priority to Korean Patent Application No. 10-2022-0183247, filed on Dec. 23, 2022, the disclosures of which are incorporated herein by reference in their entireties.

BACKGROUND

1. Field

The disclosure relates to a time of flight (ToF) sensor including a plurality of light emitting parts and a method for controlling thereof, and more particularly, to a ToF sensor that identifies a distance between an object and the ToF sensor using the plurality of light emitting parts and a method for controlling thereof.

2. Description of Related Art

ToF sensors are used in various fields. A ToF sensor mounted to a user terminal device (e.g., a smartphone, a tablet personal computer (PC), etc.) may detect an object at a vicinity of a user. As a distance between the object and the user may be identified, an accident which was not recognized by the user may be prevented in advance, and further allow for an autonomous driving of various electronic devices (e.g., an automobile, a robot, etc.).

The ToF sensor may be divided into a direct ToF (dToF) sensor and an indirect ToF (iToF) sensor according to an operation method.

The dToF sensor may identify, based on a time of flight spent until light output from the dToF sensor is received reflected by an object, a distance between the object and the dToF sensor. At this time, the dToF sensor requires a single-photon avalanche diodes (SPADs) for a high speed measurement of the time of flight of light, and because of the above, there is a problem of a manufacturing cost of the dToF sensor being relatively expensive. In addition to the above, for a long distance measurement, a size of a plano-convex lens that collects light reflected by an object of the dToF sensor needs to be manufactured to be greater, but the above not only leads to the manufacturing cost of the dToF sensor becoming expensive, but also another problem of a dToF sensor not being able to be mounted to a small-scale electronic device.

The iToF sensor may identify, based on light output from the iToF sensor being received reflected by an object, the distance between the object and the iToF sensor based on a phase difference of the received light. However, the iToF sensor has a problem of not being able to identify the distance between an object positioned at a far distance and the iToF sensor or identifying the distance incorrectly.

SUMMARY

According to an aspect of the disclosure, a time of flight (ToF) sensor including: a first light emitter configured to output first light having a first pattern; a second light emitter configured to output second light having a second pattern; an image sensor including a plurality of pixels; and at least one processor configured to: control the first light emitter and the second light emitter to sequentially output the first light and the second light, obtain, based on the output first light and the output second light being received through the image sensor by being reflected by a plurality of objects, a first image frame corresponding to the received first light and a second image frame corresponding to the received second light, identify distances between the ToF sensor and the plurality of objects based on the first image frame and the second image frame, identify, based on a plurality of pixel values included in the first image frame, a first area corresponding to an object among the plurality of objects in the first image frame, a first distance between the object and the ToF sensor being less than a pre-set distance from, determine an exposure time of the image sensor for the second light based on a plurality of first pixel values included in remaining areas excluding the first area in the first image frame, and obtain, based on the second light being output through the second light emitter, the second image frame by receiving the second light reflected by the plurality of objects through the image sensor based on the exposure time.

The at least one processor may be further configured to: identify the first distance between the object and the ToF sensor based on the plurality of pixel values included in the first image frame, and identify a second distance between an object and the ToF sensor based on the plurality of pixel values included in the second image frame, the second distance being greater than or equal to the pre-set distance from among the plurality of objects.

The at least one processor may be further configured to: obtain distance values corresponding to each of the plurality of pixels of the image sensor based on each of the plurality of pixel values included in the first image frame, and identify the first area corresponding to the object from the first image frame based on the distance values.

The at least one processor may be further configured to identify an average value of the plurality of pixel values included in the remaining areas in the first image frame, and determine the exposure time of the image sensor for the second light based on the identified average value and a pre-set target brightness value.

The at least one processor may be further configured to: determine an exposure time of the image sensor for the first light based on the plurality of pixel values included in the second image frame obtained based on the plurality of pixel values included in the first image frame and the exposure time, and obtain, based on the first light being output through the first light emitter, the first image frame by receiving the first light reflected by the plurality of objects through the image sensor based on the exposure time.

The at least one processor may be further configured to: identify a second area having a saturated pixel value from the second image frame based on the plurality of pixel values included in the second image frame, and determine the exposure time of the image sensor for the first light based on sizes of the first area and the second area.

The at least one processor may be further configured to: determine, based on a size of the first area being smaller than a size of the second area, the exposure time of the image sensor for the first light as a value smaller than a previous exposure time for the first light, and determine, based on the size of the first area being greater than the size of the second area, the exposure time of the image sensor for the first light as a value greater than the previous exposure time for the first light.

According to an aspect of the disclosure, a method for controlling a time of flight (ToF) sensor, includes: sequentially outputting a first light of a first pattern which is generated through a first light emitter and a second light of a second pattern which is generated through a second light emitter; obtaining a first image frame corresponding to the first light and a second image frame corresponding to the second light by receiving the first light and the second light reflected by a plurality of objects through an image sensor; and identifying distances between the ToF sensor and the plurality of objects based on the first image frame and the second image frame, wherein the obtaining the first image frame and the second image frame may include: outputting the first light through the first light emitter; obtaining the first image frame corresponding to the first light by receiving the first light reflected by the plurality of objects through the image sensor; identifying a first area corresponding to an object from among the plurality of objects in the first image frame based on a plurality of pixel values included in the first image frame, a first distance between the object and the ToF sensor being less than a pre-set distance; determining an exposure time of the image sensor for the second light based on a plurality of first pixel values included in remaining areas excluding the first area in the first image frame; outputting the second light through the second light emitter; and obtaining the second image frame by receiving the second light reflected by the plurality of objects through the image sensor based on the exposure time.

The identifying distances between the ToF sensor and the plurality of objects may include: identifying the first distance between the object and the ToF sensor based on the plurality of pixel values included in the first image frame, and identifying a second distance between an object and the ToF sensor based on a plurality of pixel values included in the second image frame, the second distance being greater than or equal to the pre-set distance from among the plurality of objects.

The identifying the first area may include: obtaining distance values corresponding to each of the pixels of the image sensor based on each of the plurality of pixel values included in the first image frame; and identifying the first area corresponding to the object in the first image frame based on the distance values.

According to an aspect of the disclosure, a method for controlling a time of flight (ToF) sensor of claim 10, The determining the exposure time of the image sensor for the second light may include: identifying an average value of the plurality of pixel values included in the remaining areas in the first image frame, and determining the exposure time of the image sensor for the second light based on the average value and a pre-set target brightness value.

The method may further include: determining the exposure time of the image sensor for the first light based on the plurality of pixel values included in the second image frame obtained based on the plurality of pixel values included in the first image frame and the exposure time; and obtaining, based on the first light being output through the first light emitter, the first image frame by receiving the first light reflected by the plurality of objects through the image sensor based on the exposure time.

The method may further include: identifying a second area having a saturated pixel value in the second image frame based on the plurality of pixel values included in the second image frame; and determining the exposure time of the image sensor for the first light based on sizes of the first area and the second area.

The determining the exposure time of the image sensor for the first light may include: determining, based on a size of the first area being smaller than a size of the second area, the exposure time of the image sensor for the first light as a value smaller than a previous exposure time for the first light, and determining, based on the size of the first area being greater than the size of the second area, the exposure time of the image sensor for the first light as a value greater than the previous exposure time for the first light.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8 and 9 are example diagrams illustrating determining of an exposure time of second light based on a first image frame and a second image frame according to one or more embodiments of the disclosure;

DETAILED DESCRIPTION

Figure 1:
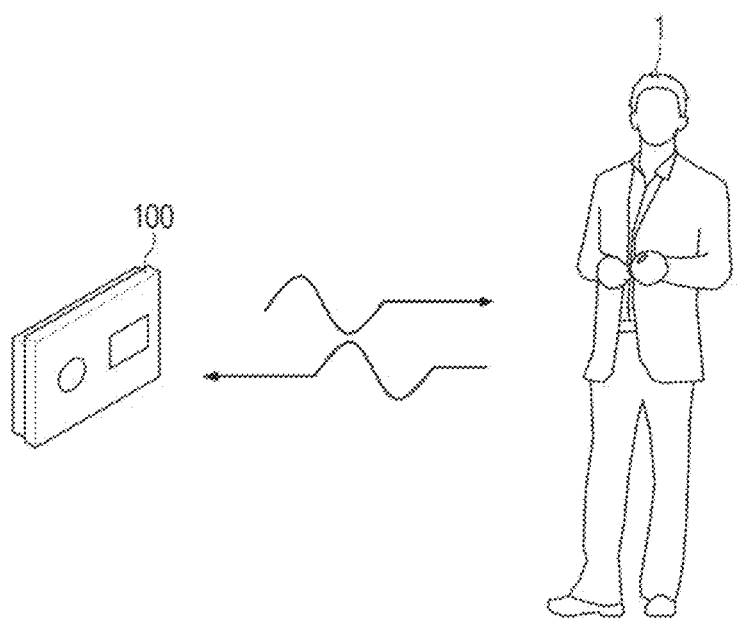
FIG. 1 is a diagram illustrating a time of flight (ToF) sensor according to one or more embodiments of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but should be interpreted to include all modifications, equivalents or alternatives of one or more embodiments of the disclosure. With respect to the description of the drawings, like reference numerals may be used for like elements.

In describing the disclosure, in case it is determined that the detailed description of related known technologies may unnecessarily confuse the gist of the disclosure, the detailed description thereof will be omitted.

Further, the one or more embodiments below may be modified to various different forms, and it is to be understood that the scope of the technical spirit of the disclosure is not limited to the embodiments below. Rather, the embodiments thereof are provided so that the disclosure will be thorough and complete, and to fully convey the technical spirit of the disclosure to those skilled in the art.

Terms used herein have merely been used to describe a specific embodiment, and not to limit the scope thereof. A singular expression includes a plural expression, unless otherwise specified.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including only A, only B, or both of A and B.

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

Alternatively, when a certain element (e.g., first element) is indicated as "directly coupled with/to" or "directly connected to" another element (e.g., second element), it may be understood as the other element (e.g., third element) not being present between the certain element and the another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a sub-processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in a memory device.

The term 'module' or 'part' used in one or more embodiments herein perform at least one function or operation, and may be implemented with a hardware or software, or implemented with a combination of hardware and software. Further, a plurality of 'modules' or a plurality of 'parts,' except for a 'module' or a 'part' which needs to be implemented to a specific hardware, may be integrated to at least one module and implemented in at least one processor.

Various elements and areas of the drawings may be drawn schematically. Accordingly, the technical spirit of the disclosure is not limited by a relative size or distance shown in the accompanied drawings.

One or more embodiments of the disclosure will be described in detail below with reference to the accompanied drawings to aid in the understanding of those of ordinary skill in the art.

FIG. 1 is a diagram illustrating a time of flight (ToF) sensor according to one or more embodiments of the disclosure.

Referring to FIG. 1, according to one or more embodiments of the disclosure, the ToF sensor 100 may identify a distance between the ToF sensor and an object 1.

For example, the ToF sensor 100 according to one or more embodiments of the disclosure may identify, based on light output from the ToF sensor 100 being received reflected by an object, the distance between the ToF sensor 100 and the object 1 may be identified based on a difference between a phase of output light and a phase of received light. For example, the ToF sensor according to one or more embodiments of the disclosure may be an indirect time of flight (iToF) sensor.

A direct time of flight (dToF) sensor may identify a distance between the dToF sensor and the object 1 based on time spent until light output from the dToF sensor is received by the dToF sensor. For example, the dToF sensor may calculate or obtain the time of flight of light, and identify the distance between the dToF sensor and the object 1 based on the calculated time of flight.

The dToF sensor may have to modulate light that is output from an emission part of the dToF sensor at a relatively high speed to obtain a more accurate time-point at which light reflected by the object 1 is received. The dToF sensor may have a single-photon avalanche diode (SPAD) device for high speed measurement. Thereby, the dToF sensor may have a disadvantage of the manufacturing cost becoming expensive.

In addition, in the case of the dToF sensor, a plano-convex lens may need to be included in order to receive the light reflected by the object 1. For example, in order to measure long distance, a size of the plano-convex lens of the dToF sensor has to be manufactured larger, and this leads to problems of the manufacturing cost of the dToF sensor becoming expensive.

In addition to the above, due to the size of the plano-convex lens increasing, it may lead to a problem of mounting the dToF sensor or the dToF sensor based light detection and ranging (LiDAR) sensor on the small-scale electronic device being difficult.

In the case of the iToF sensor, because the single-photon avalanche diode (SPAD) device and the plano-convex lens for a relatively high speed measurement is not required, a manufacturing cost aspect of the iToF sensor may be decreased, and the iToF sensor may also be mountable in small-scale electronic devices.

However, in the case of iToF sensors of the related art, there is a problem of not being able to identify objects positioned at relatively long distances. For example, the iToF sensor may receive light reflected by an object after being output from the iToF sensor through an image sensor which includes a plurality of pixels 10. At this time, the iToF sensor may obtain pixel values corresponding to each of the pixels by receiving light reflected through the plurality of pixels 10. Then, the iToF sensor may identify the distance between the iToF sensor and the object based on the pixel values.

Here, the pixel value may correspond to an intensity of light received by each of the pixels, and the light reflected by the object positioned at a relatively far distance may be such that an intensity of received light is relatively smaller in intensity of light than the light reflected by the object positioned at a close distance. For example, a pixel value of the pixel that received the light reflected by the object which is positioned at a relatively far distance may have a relatively small value, and may be resulted from collectively applying an exposure time which is applied in receiving reflected light of the image sensor for the plurality of pixels 10 in the image sensor.

Therefore, the iToF sensor may have to identify the distance based on pixel values having small values for the object positioned at a relatively far distance. Because of the above, reliability in the identified distance may decrease. For example, a distance between objects positioned at a far distance from the iToF sensor may be less accurately identified. Furthermore, the pixel value for the object may not be obtained as the distance between the iToF sensor and an object increases.

To solve the above-described problems, the ToF sensor 100 according to one or more embodiments may output light of various forms different from one another as shown in FIG. 1. For example, the ToF sensor 100 may divide light used to identify the distance with the object positioned at a relatively close distance and light used to identify the distance with the object positioned at a relatively far distance. Then, the ToF sensor 100 may identify not only the object positioned at a relatively close distance but also the distance with the object positioned at a relatively far distance based on information obtained by each of the lights.

Through the above, the ToF sensor according to one or more embodiments may simultaneously solve or improve the disadvantages held by the dToF sensor and the iToF sensor of the related art. The iToF sensor according to one or more embodiments associated with the above will be described in detail below.

Figure 2:
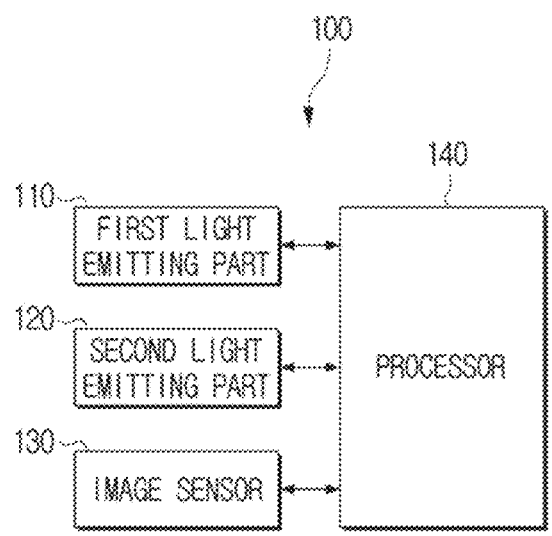
FIG. 2 is a block diagram of an indirect time of flight (iToF) sensor according to one or more embodiments of the disclosure.

FIG. 2 is a block diagram of an indirect time of flight (iToF) sensor according to one or more embodiments of the disclosure.

According to one or more embodiments of the disclosure, the ToF sensor 100 may include a first light emitter 110, a second light emitter 120, an image sensor 130, and a processor 140. The ToF sensor 100 may not necessarily be implemented including all of the configurations described above, and may be implemented with some configurations omitted or added.

The first light emitter 110 may output modulated light toward an object 2 located in a vicinity of the ToF sensor 100. The modulated light (hereinafter, referred to as output light) that is output from the first light emitter 110 may have a waveform in a square wave form or a waveform in a sinusoidal wave form. In an example, the first light emitter 110 may output a square wave of a pre-set frequency at every pre-set period. However, embodiments are not limited thereto, and the first light emitter 110 may have waveforms of various forms.

The first light emitter 110 may include a laser device of various types. In an example, the first light emitter 110 may include a vertical cavity surface emitting laser (VCSEL) or a laser diode. At this time, the first light emitter 110 may include a plurality of laser devices. The plurality of laser devices may be arranged in an array form.

The first light emitter 110 may further include an element that diffuses light being output such as, for example, a diffuser plate. Through the above, the first light emitter 110 may output light in a first pattern. Here, light in the first pattern may be light of a flood or a surface light source pattern. The light in the first pattern being output (or being emitted) from the first light emitter may be referred to as a first light for convenience of description below.

The second light emitter 120 may also, as with the first light emitter 110, output the modulated light toward the object 2 located in the vicinity of the ToF sensor 100. With respect to the second light emitter 120, the description of the first light emitter 110 may be identically applied.

However, embodiments are not limited thereto, and the second light emitter 120 may output light in a second pattern different from the first light emitter 110. For example, whereas the first light emitter 110 outputs first light in the first pattern, the second light emitter 120 may output second light in the second pattern different from the first pattern. Here, the light in the second pattern may be light of, for example, a spot or a dot pattern of relatively high-density. To this end, the second light emitter 120 may further include an element that diffracts light such as, for example, a diffractive optics element (DOE). The light in the second pattern that is output (or emitted) from the second light emitter may be referred to as a second light for convenience of description below.

The image sensor 130 may obtain light reflected by the object 2 (hereinafter, referred to as reflected light). For example, the image sensor 130 may receive first light which returns back toward the ToF sensor 100 by being reflected by the object 2 after being output from the first light emitter 110. Then, the image sensor 130 may identify, after identifying the difference between the phase of the received first light and the phase of the first light output from the first light emitter 110, a depth value for the object 2 based on a phase difference. Here, the depth value may be a distance value between the ToF sensor 100 and the object 2 identified by the image sensor 130.

In addition, the image sensor 130 may receive second light which returns back toward the ToF sensor 100 by being reflected by the object 2 after being output from the second light emitter 120. Then, the image sensor 130 may identify the depth value for the object 2 based on the phase difference after identifying the difference between the phase of the received second light and the phase of the second light output from the second light emitter 120.

As described above, the image sensor 130 may receive, based on the first light and the second light output from the respective first light emitter and the second light emitter being reflected by the object 2, the reflected first light and second light, respectively, identify the distance between the object 2 and the iToF sensor based on the first light, and identify the distance between the object 2 and the iToF sensor based on the second light. At this time, the object 2 which is a target for identifying the distance with the iToF sensor based on the first and second light may vary according to respective forms of light (i.e., first and second light). In an example, the object with which the distance is identified based on first light may be an object positioned at a relatively close distance, and the object with which the distance is identified based on second light may be an object positioned at a relatively far distance.

The image sensor 130 may be connected with the first light emitter 110 and obtain phase information of first light which is output from the first light emitter 110 or the processor 140 connected with the first light emitter 110, the difference between the phase of the first light output from the first light emitter 110 and the phase of the received first light. Similarly, the image sensor 130 may also identify a difference between a phase of second light and a phase of the received second light from the second light emitter 120.

Figure 3:
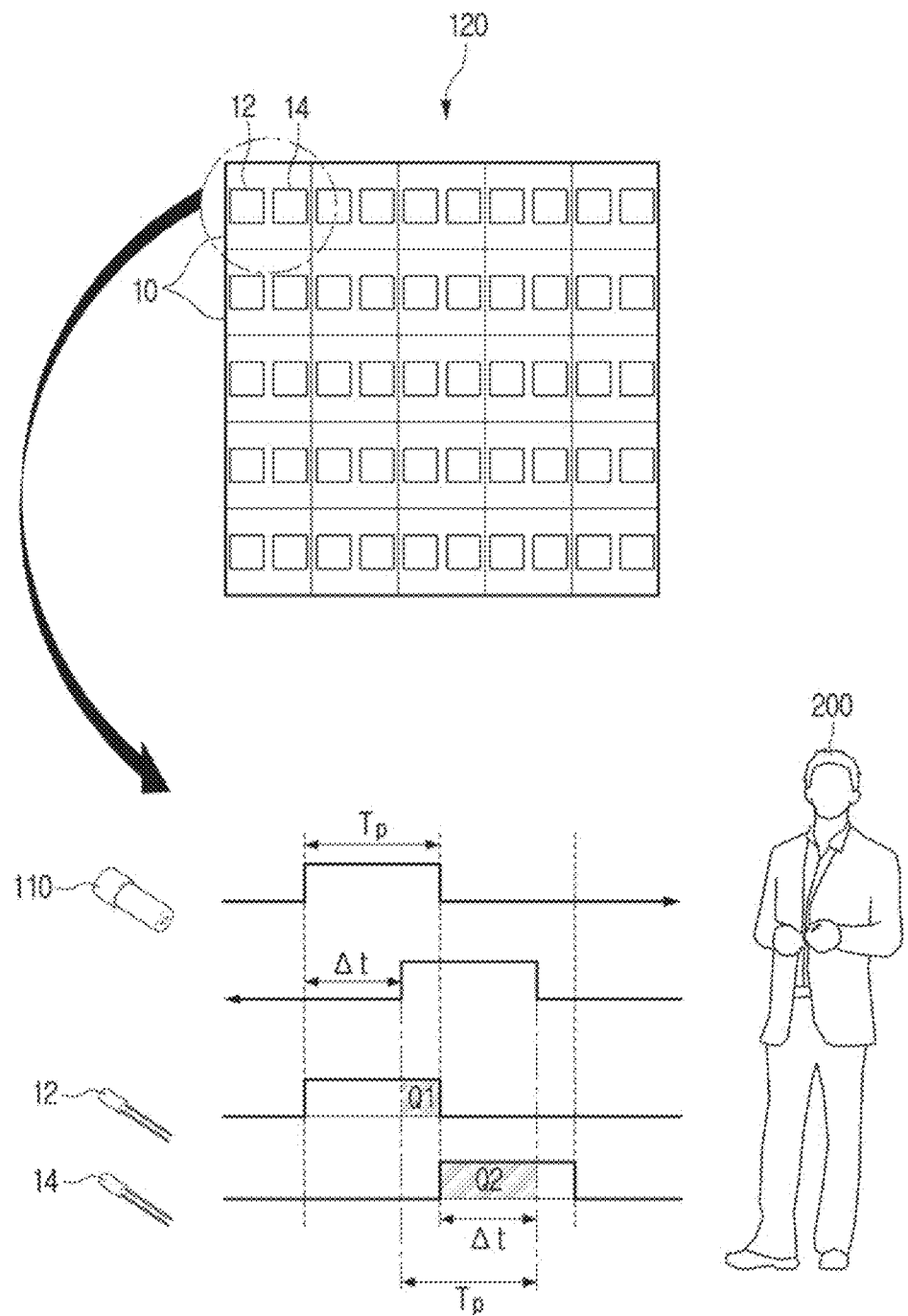
FIG. 3 is a diagram illustrating a plurality of pixels included in an image sensor according to one or more embodiments of the disclosure.

FIG. 3 is a diagram illustrating the plurality of pixels 10 included in the image sensor according to one or more embodiments of the disclosure.

According to one or more embodiments of the disclosure, the image sensor 130 may be implemented as a charge coupled device (CCD) image sensor or a complementary metal oxide semiconductor (CMOS) image sensor. At this time, the image sensor 130 may include the plurality of pixels 10. Here, each of the pixels 10 may be a unit that represents a sensing device for receiving light reflected by the object 2. In an example, each of the pixels 10 may include at least one photo diode as a sensing device for receiving the reflected light.

The plurality of pixels 10 may be disposed in various forms and form the image sensor 130. In an example, the plurality of pixels 10 may implement a pixel array by being disposed in a N×M (N, M being a natural number of greater than or equal to 1) matrix form. In FIG. 3, the plurality of pixels 10, which are included in the image sensor 130, has been shown as being disposed in a 5×5 matrix form. However, embodiments are not limited thereto, and the plurality of pixels 10 may be formed of various number of pixels, and the plurality of pixels 10 may be disposed in various forms.

The image sensor 130 may further include a collecting part for collecting the reflected light (the first light and the second light reflected by the object). At this time, the collecting part may be implemented as a lens, a mirror, or the like.

At least one processor 140 according to one or more embodiments of the disclosure may control the overall operation and functions of the ToF sensor 100.

The at least one processor 140 may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 140 may control one or a random combination from among other elements of the electronic device, and perform an operation associated with communication or data processing. The at least one processor 140 may execute at least one program or instruction stored in a memory. For example, the at least one processor 140 may perform, by executing at least one instruction stored in the memory, a method according to one or more embodiments of the disclosure.

When a method according to one or more embodiments of the disclosure includes a plurality of operations, the plurality of operations may be performed by one processor 140, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 140 may be implemented as a single core processor that includes one core, or as at least one multicore processor that includes a plurality of cores (e.g., a homogeneous multicore or a heterogeneous multicore). When the at least one processor 140 is implemented as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for implementing a method according to one or more embodiments, or read and perform a program command for implementing a method according to one or more embodiments of the disclosure due to a whole (or a portion) of the plurality of cores being interconnected.

When a method according to one or more embodiments of the disclosure include a plurality of operations, the plurality of operations may be performed by one core from among the plurality of cores or performed by the plurality of cores. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, the processor may refer to a system on chip (SoC), a single core processor 140, or a multicore processor in which the at least one processor and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but is not limited to the one or more embodiments of the disclosure.

For example, the at least one processor 140 will be referred to as the processor 140 below.

According to one or more embodiments of the disclosure, the processor 140 may receive reflected light (first and second light) through the image sensor 130 when light (first and second light) output through the light emitters (first and second light emitters 110 and 120) is reflected by the object 2. Then, the processor may obtain a plurality of pixel values for each of the pixels 10 included in the image sensor 130 according the reflected light (first and second light) being received. At this time, the processor 140 may obtain the distance value corresponding to the distance between the ToF sensor 100 and the object 2 based on the pixel value obtained from each of the pixels 10. Further, the processor 140 may identify the distance between the ToF sensor 100 and the object 2 based on the obtained distance value.

For example, referring to FIG. 3, the pixels 10 included in the image sensor 130 may include a plurality of receptors configured to receive reflected light reflected by the object 2. The plurality of receptors may be activated with a pre-set time period therebetween, and may receive reflected light with the pre-set time interval therebetween. In FIG. 3, although two receptors have been shown as being included in each of the pixels, the number and arrangement form of the receptors included in the pixels may be variously modified according to one or more embodiments.

A receptor that receives reflected light first from among the plurality of receptors included in each of the pixels may be referred to as a first receptor 12 below. Then, a receptor that receives reflected light after a pre-set time from a time-point at which the first receptor 12 starts to receive the reflected light may be referred to as a second receptor 14. In FIG. 3, the receptor disposed at a left side from among the plurality of receptors included in each of the pixels is shown as the first receptor 12 and the receptor disposed at a right side from among the plurality of receptors is shown as the second receptor 14.

Each receptor may obtain a pixel value corresponding to an intensity of the received reflected light. To this end, the receptor may include a photodiode (PD) and an avalanche photodiode (APD). For example, the receptor may obtain, based on receiving the reflected light, an electric charge amount accumulated in a diode as a pixel value so as to correspond to the intensity of reflected light. However, embodiments are not limited thereto, and the receptor may obtain a current value that flows to the diode as the pixel value according to receiving the reflected light. However, for example, the pixel value has been described assuming that it is an electric charge amount.

As described in the above, the plurality of receptors (e.g., the first receptor 12 and the second receptor 14) may be included in each of the pixels, and because the plurality of receptors are activated with the pre-set time interval therebetween, the processor 140 may obtain the plurality of pixel values for each of the pixels. For example, the plurality of pixel values obtained from each of the pixels may include the pixel value obtained by the first receptor 12 and the pixel value obtained by the second receptor 14.

For example, the processor 140 may activate the first receptor 12 from among the plurality of receptors at a time-point t1 at which the first light is output from the first light emitter 110. Then, the processor 140 may turn-off the activated first receptor 12 and activate the second receptor 14 at a time-point t3 at which a pre-set time interval TP is passed after t1. At this time, in the first receptor 12 and the second receptor 14, Q1 and Q2, which are different electric charge amounts from one another according to the intensity of reflected light of a received first frequency, may be respectively accumulated.

For example, in the case of a pixel disposed in row 1 and column 1 from among the plurality of pixels 10 disposed in the matrix form, when light in a first frequency output at t1 is reflected by the object 2, an electric charge may be accumulated in the first receptor 12 of the pixel disposed in row 1 and column 1 from a time-point t2 at which reflected light in the first frequency is received. Then, when the first receptor 12 is turned-off at t3, and the second receptor 14 is turned-on, an electric charge may be accumulated according to the reflected light in the first frequency being received in even the second receptor 14 of the pixel disposed in row 1 and column 1. At this time, in the pixel disposed in row 1 and column 1, Q1 and Q2 may be obtained respectively as the plurality of pixel values. The time period at which the first receptor 12 and the second receptor 14 are activated (or turned-on) may be set based on a frequency (or period) of output light.

Then, the processor 140 may identify, based on the Q1 and Q2 which are the plurality of pixel values, a difference Δt in phase of first light received from the pixel disposed in row 1 and column 1 and a phase of first light output from the first light emitter. In an example, the processor 140 may identify the difference Δt in the phase of first light received from the pixel disposed in row 1 and column 1 and the phase of first light output from the first light emitter based on the phase, the frequency, and the period of first light output from the first light emitter 110 or the plurality of pixel values (Q1 and Q2). According to another embodiment, the processor 140 may also identify the phase in first light received from the pixel disposed in row 1 and column 1 and the phase of first light output from the first light emitter based on the difference of the plurality of pixel values (Q1 and Q2).

Then, the processor 140 may obtain the distance value corresponding to each of the pixels based on the difference in the phase of the first light received by each of the pixels 10 and the phase of first light output from the first light emitter. In an example, the distance value may be identified with the following Equation 1.

$$\text{Distance value} = \frac{1}{2} c \times T_{p1} \times \frac{Q_1}{Q_2} \quad [\text{Equation 1}]$$

Here, c represents a speed of light, Tp1 presents a period of first light, Q1 represents an electric charge amount accumulated in the first receptor 12 according to receiving the first light, and Q2 represents an electric charge amount accumulated in the second receptor 14 according to receiving the first light.

In FIG. 3, although the first receptor 12 and the second receptor 14 have been shown as having been activated one time each, embodiments are not limited thereto, and the first receptor 12 and the second receptor 14 may accumulate the electric charge amount by accumulating based on being turned-off after being activated a plurality of times.

The description of the embodiment described above based on FIG. 3 may be identically applicable for even the second light output from the second light emitter.

The processor 140 according to one or more embodiments of the disclosure may obtain the distance value for each of the pixels 10 included in the image sensor 130, and identify the distance between objects corresponding to each of the pixels. For example, a front position (direction and angle) of the ToF sensor 100 identified by the processor 140 may be set according to positions of each of the pixels in a plurality of image sensors 130. Accordingly, the processor 140 may identify the distance values for each of the pixels, and identify the respective distances between a plurality of objects 200 positioned at a front direction of the ToF sensor 100 and the ToF sensor 100 based on the identified distance value.

Figure 4:
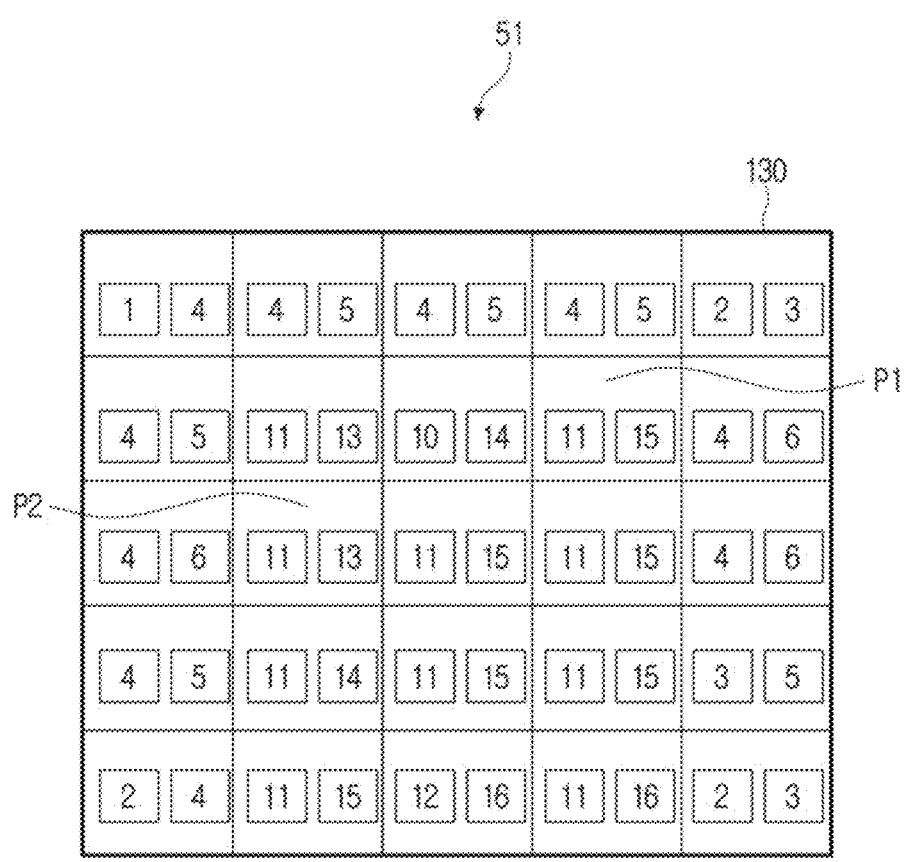
FIG. 4 is an example diagram illustrating a plurality of pixel values included in a first image frame corresponding to first light according to one or more embodiments of the disclosure.

FIG. 4 is an example diagram illustrating a plurality of pixel values included in a first image frame corresponding to first light 1 according to one or more embodiments of the disclosure.

Referring to FIG. 4, the plurality of pixel values obtained through the image sensor 130 will be described in detail. Referring to FIG. 3 and FIG. 4, the processor 140 may receive, based on the first light 1 output from the first light emitter 110 being reflected by an object 200, the reflected first light through the image sensor 130. Then, the processor 140 may obtain the plurality of pixel values for the plurality of pixels 10 included in the image sensor 130.

In an example, referring to FIG. 4, the plurality of pixels 10 (e.g., the first receptor 12 and the second receptor 14) may obtain the plurality of pixel values, respectively. For example, a pixel P1 disposed in row 2 and column 4 may obtain 11 and 15 as the plurality of pixel values. For example, the pixel P1 disposed in row 2 and column 4 obtained 11 as the pixel value obtained by the first receptor 12 and 15 as the pixel value obtained by the second receptor 14 from among the plurality of receptors. In addition, a pixel P2 disposed in row 3 and column 2 obtained 11 and 13 as the plurality of pixel values. For example, the pixel P2 disposed in row 3 and column 2 obtained 11 as the pixel value obtained by the first receptor 12 and 13 as the pixel value obtained by the second receptor 14 from among the plurality of receptors. As described, each of the pixels may obtain the plurality of pixels values by the plurality of receptors (e.g., the first receptor 12 and the second receptor 14) which are activated at different time-points from one another.

At this time, the processor 140 according to one or more embodiments of the disclosure may identify the intensity of light received by each of the pixels based on the plurality of pixel values for each of the pixels. In an example, the intensity of light received by each of the pixels may be identified with a sum of the plurality of pixel values for each of the pixels.

In an example, the intensity of light received by the pixel P1 disposed in row 2 and column 4 within the image sensor 130 may be identified as 26 (11+15), and the intensity of light received by the pixel P2 disposed in row 3 and column 2 within the image sensor 130 may be identified as 24 (11+13). As described, even when the plurality of pixel values are obtained based on the same first light 1, an intensity of first light 1 (or pixel value) obtained from each of the pixels may vary as it is received by each of the pixels after being reflected by different objects 200 from one another according to being diffused by the first light 1.

The processor 140 may receive, every time the first light 1 is output through the first light emitter 110, the first light 1 reflected by the object 200 through the image sensor 130, and obtain the pixel values of the plurality of pixels 10 within the image sensor 130 for the first light 1. Then, the processor 140 may identify the distance between the object 200 and the ToF sensor 100 based on the pixel values of the plurality of pixels 10 for the obtained first light 1. A unit representing the plurality of pixel values obtained through the image sensor every time the first light 1 is received as described above will be referred to as a first image frame 51 below.

Similarly, a unit representing the plurality of pixel values obtained through the image sensor 130 every time second light 2 which is reflected by the object 200 after being output through the second light emitter 120 is received will be referred to as a second image frame 52.

In addition, the processor 140 may identify, based on a difference in pixel values obtained at different time-points from another (or obtained by different receptors from one another), a difference in the phase of light output from the light emitter 110 and the phase in light received from the image sensor 130, and based on the difference in phase of the identified light, the processor 140 may obtain the distance value corresponding to the distance between the ToF sensor 100 and the object 200. Because the above has been described in FIG. 3, detailed descriptions thereof will be omitted.

The processor 140 may obtain a depth image for the object 200 based on the pixel values obtained through the plurality of pixels 10.

Figure 5:
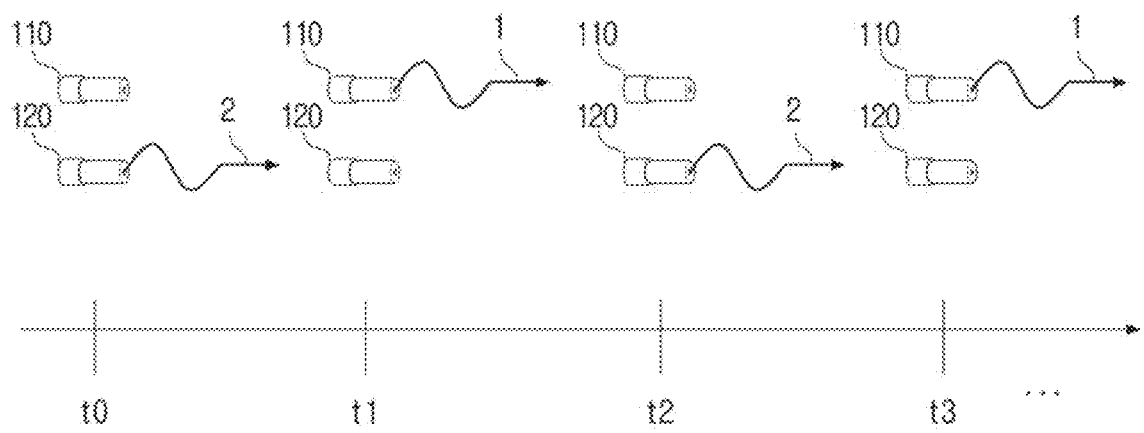
FIG. 5 is an example diagram illustrating first light and second light being sequentially output according to one or more embodiments of the disclosure.

FIG. 5 is an example diagram illustrating the first light 1 and the second light 2 being sequentially output according to one or more embodiments of the disclosure.

The processor 140 according to one or more embodiments of the disclosure may control the first light emitter 110 and the second light emitter 120 to sequentially output the first light 1 and the second light 2. Then, the processor 140 may obtain, based on the output first light 1 and the second light 2 being received through the image sensor 130 by being reflected by the plurality of objects 200, the first image frame 51 corresponding to the received first light 1 and the second image frame 52 corresponding to the received second light 2. Then, the processor 140 may identify the distances between the ToF sensor 100 and the plurality of objects based on the first image frame 51 and the second image frame 52.

For example, the processor 140 may control the first light emitter 110 and the second light emitter 120 to alternately output the first light 1 and the second light 2 at every pre-set period. In an example, referring to FIG. 5, the processor 140 may output the first light 1 through the first light emitter 110 at the t1 time-point, and output the second light 2 through the second light emitter 120 at the t2 time-point. Then, the processor 140 may again output the first light 1 through the first light emitter 110 at the t3 time-point again.

For example, the processor 140 may obtain the first image frame 51 corresponding to the first light 1 output through the first light emitter 110, and output the second light 2 through the second light emitter 120 after identifying the distances between the plurality of objects 200 and the ToF sensor 100 based on the first image frame 51.

For example, the processor 140 may receive, based on the first light 1 output through the first light emitter 110 being reflected by the plurality of objects 200, the first light 1 reflected through the image sensor 130. Then, the processor 140 may obtain, based on the received first light 1, the plurality of pixel values corresponding to each of the pixels 10 included in the image sensor 130. For example, the processor 140 may obtain the first image frame 51 corresponding to the first light 1. At this time, the plurality of pixel values included in the first image frame 51 may correspond to the intensity of the received first light 1.

Then, the processor 140 may obtain, based on the plurality of pixel values included in the first image frame 51, the distance values corresponding to each of the pixels. Through the above, the processor 140 may identify the distances between the ToF sensor 100 and the plurality of objects. As described above, the processor 140 may identify the distance with the object 200 which is positioned at a position and a direction corresponding to each of the pixels based on the obtained distance value corresponding to each of the pixels. Here, the object 200 may be positioned in a direction at which the first light 1 is output from the first light emitter 110.

The processor 140 may output the second light 2 through the second light emitter 120 after the distances between the ToF sensor 100 and the plurality of objects are identified based on the first image frame 51. Then, the processor 140 may receive, based on the second light 2 output through the second light emitter 120 being reflected by the plurality of objects 200, the second light 2 reflected through the image sensor 130. Then, the processor 140 may obtain the plurality of pixel values corresponding to each of the pixels 10 included in the image sensor 130 based on the received second light 2. For example, the processor 140 may obtain the second image frame 52 corresponding to the second light 2. At this time, the plurality of pixel values included in the second image frame 52 may correspond to an intensity of the received second light 2.

Then, the processor 140 may obtain, based on the plurality of pixel values included in the second image frame 52, the distance values corresponding to each of the pixels. Through the above, the processor 140 may identify the distances between the ToF sensor 100 and the plurality of objects. As described above, the processor 140 may identify the distance with the object 200 positioned at a position and a direction corresponding to each of the pixels based on the obtained distance values corresponding to each of the pixels.

As described, the processor 140 may alternately output the first light 1 and the second light 2, and identify the distance between the ToF sensor 100 and the object based on each of the image frames by obtaining the first image frame 51 corresponding to the first light 1 and the second image frame 52 corresponding to the second light 2. At this time, the first image frame 51 obtained based on the first light 1 in a flood form may be used to identify a distance of the object 200 positioned at a relatively close distance from among the objects 200 in the vicinity of the ToF sensor 100, and the second image frame 52 obtained based on the second light 2 in a spot form may be used to identify a distance of the object 200 positioned at a relatively far distance from among the objects 200 in the vicinity of the ToF sensor 100.

The processor 140 according to one or more embodiments of the disclosure may determine an exposure time of the image sensor 130 for the second image frame 52 based on the first image frame 51. According to another embodiment, the processor 140 may determine an exposure time of the image sensor 130 for the first image frame 51 based on the second image frame 52.

Here, the exposure time may be time for exposing the image sensor 130 to receive the reflected light. The exposure time may be different from the time in which the receptor described in FIG. 3 is turned-off after being activated (or turned-on). For example, when the receptor is repeatedly activated and turned-off to receive the output light reflected by the object 200, the exposure time may correspond to a number of times the receptor is repeatedly activated and turned-off, or time spent while the receptor is initially activated and turned-off last.

According to one or more embodiments of the disclosure, the processor 140 may set the exposure time corresponding to the first light 1 and the exposure time corresponding to the second light 2. For example, the processor 140 may respectively divide and set the time for exposing the image sensor 130 to receive the reflected first light 1 and the time for exposing the image sensor 130 to receive the reflected second light 2. The second light 2 may be used to identify the distance for the object 200 positioned at a far distance. Accordingly, in the case of the second light 2, the processor 140 may expose the image sensor 130 for a relatively longer time than the first light 1, which is for receiving the second light 2 of a relatively weak intensity reflected by the object 200 positioned at a far distance for a long time. According to another embodiment, because the first light 1 is used to identify the distance for the object 200 positioned at a relatively close distance, the processor 140 may receive, even if the image sensor 130 is exposed for a relatively short time, the first light 1 of a relatively large intensity reflected by the object 200 positioned at a relatively close distance. As described, the processor 140 may divide the first light 1 and the second light 2 and set the exposure time of the image sensor 130 corresponding to each of the lights (i.e., the first light 1 and the second light 2).

To set the exposure time of the image sensor 130 for each of the first light 1 and the second light 2, the processor 140 may use a previously set exposure time and an image frame obtained by different light.

For example, referring back to FIG. 5, the processor 140 may use, based on outputting the second light 2 through the second light emitter 120 at t2, the first image frame 51 obtained at t1 with the exposure time set for the second light 2 output at t0 to set the exposure time for the output second light 2.

According to another embodiment, the processor 140 may use, based on outputting the first light 1 through the first light emitter 110 at t3, the second image frame 52 obtained at t2 with the exposure time set for the first light 1 output at t1 to set the exposure time for the output first light 1. An embodiment of the disclosure of determining the exposure time for each of the first light 1 and the second light 2 will be described below with reference to FIG. 6 to FIG. 9.

Figure 6:
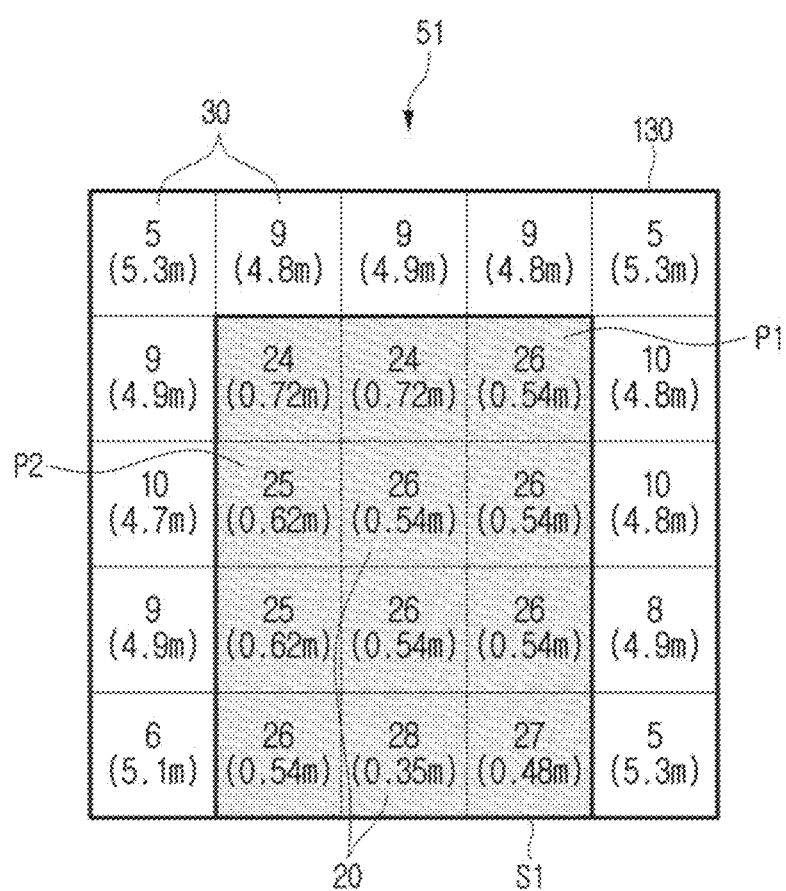
FIG. 6 is an example diagram illustrating distance values of a plurality of objects obtained based on a first image frame according to one or more embodiments of the disclosure.

FIG. 6 is an example diagram illustrating distance values of the plurality of objects 200 obtained based on the first image frame 51 according to one or more embodiments of the disclosure.

Figure 7:
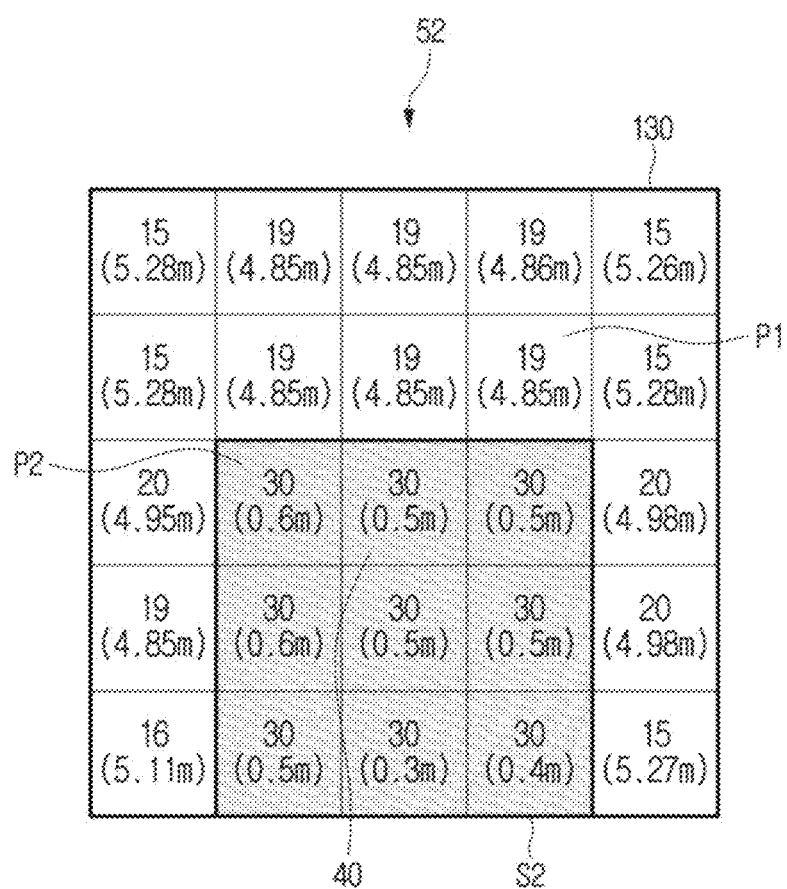
FIG. 7 is an example diagram illustrating the distance values of a plurality of objects obtained based on a second image frame according to one or more embodiments of the disclosure.

FIG. 7 is an example diagram illustrating the distance values of the plurality of objects 200 obtained based on the second image frame 52 according to one or more embodiments of the disclosure.

Figure 9:
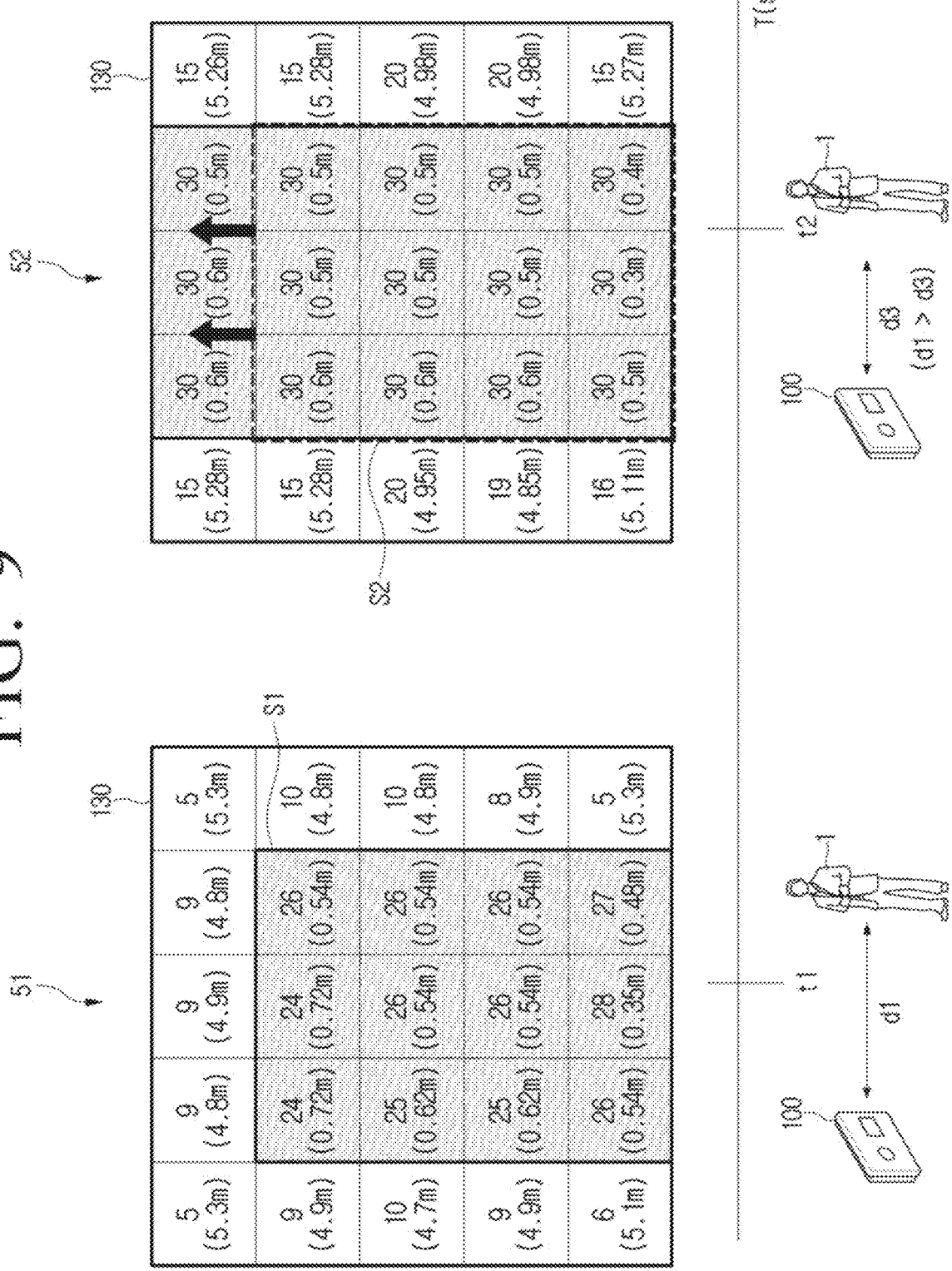

FIG. 8 and FIG. 9 are example diagrams illustrating determining of an exposure time of the second light 2 based on the first image frame 51 and the second image frame 52 according to one or more embodiments of the disclosure.

The processor 140 according to one or more embodiments of the disclosure may first identify, in order to determine the exposure time for the second light 2, a first area S1 corresponding to an object of which the distance with the ToF sensor 100 is less than or equal to a pre-set distance from among the plurality of objects 200 in the first image frame 51 based on the plurality of pixel values included in the first image frame 51.

For example, when the first image frame 51 shown in FIG. 6 is the first image frame 51 obtained based on the first light 1 output at the t1 time-point shown in FIG. 5, the processor 140 may use the first image frame 51 obtained at t1 to determine the exposure time of the image sensor 130 for the second light 2 which is to be output at the t2 time-point.

For example, the processor 140 may identify each of the pixels based on the plurality of pixel values included in the first image frame 51 and the distance between the objects corresponding to each of the pixels. Further, the processor 140 may select at least one pixel corresponding to the object 200 positioned less than a pre-set distance from the ToF sensor 100 from among the plurality of pixels 10. At this time, the processor 140 may identify the area which includes the at least one pixel selected from the first image frame 51 as the first area S1.

At this time, the processor 140 may use the distance value For example obtained based on the plurality of pixel values corresponding to each of the pixels in order to identify the distance between the object 200 corresponding to each of the pixels and the ToF sensor 100.

For example, the processor 140 may obtain the distance value corresponding to each of the pixels 10 of the image sensor 130 based on each of the pixel values included in the first image frame 51, and identify the first area S1 corresponding to the object 200 from the first image frame 51 based on the obtained distance value.

For example, the processor 140 may obtain the distance value corresponding to each of the pixels based on a difference in the plurality of pixel values obtained so as to correspond to each of the pixels. The distance value corresponding to each of the pixels may be obtained based on the difference in the plurality of pixel values corresponding to each of the pixels, and the like. Because the distance value has been described above, detailed descriptions thereof will be omitted.

Referring to FIG. 6, the processor 140 obtained the distance value of the pixel P1 disposed in row 2 and column 4 from among the plurality of pixels 10 included in the image sensor 130 as 0.54 m, and the distance value of the pixel P2 disposed in row 3 and column 2 from among the plurality of pixels 10 included in the image sensor 130 as 0.62 m. Accordingly, the processor 140 may identify the distance between the object 200 corresponding to the pixel P1 disposed in row 2 and column 4 and the ToF sensor 100 as 0.54 m, and the distance between the object 200 corresponding to the pixel P2 disposed in row 3 and column 2 and the ToF sensor 100 as 0.62 m. At this time, when the pre-set distance is 5 m, the processor 140 may select the pixel corresponding to the distance value within 5 m from among the plurality of pixels 10. For example, the processor 140 may select twelve pixels having the distance value of within 5 m from among the plurality of pixels 10 included in the image sensor 130.

Then, the processor 140 may identify the area including the selected pixels as the first area S1. Referring to FIG. 6, the processor 140 may identify a shadow processed area which includes the twelve selected pixels as the first area S1 based on the distance value.

Then, the processor 140 may determine the exposure time of the image sensor 130 for the second light 2 based on the plurality of pixel values included in remaining areas excluding the first area S1 from the first image frame 51.

For example, the processor 140 may identify at least one pixel included in the remaining areas excluding the first area S1 from the first image frame 51. Here, the remaining areas may be areas including the first area S1 from among the whole area corresponding to the image sensor 130.

Then, the processor 140 may identify the plurality of pixel values corresponding to the at least one pixel included in the remaining areas. Then, the processor 140 may determine, based on the identified plurality of pixel values, the exposure time of the image sensor 130 for the second light 2.

At this time, in the case of the at least one pixel included in the remaining areas, the processor 140 may identify as corresponding with the object 200 positioned at a relatively far distance. For example, the processor 140 may identify the pixel included in the remaining areas excluding the pixel included in the first area S1 which corresponds with the object 200 positioned less than the pre-set distance as corresponding to the object 200 positioned greater than or equal to the pre-set distance. For example, the pixel included in the first area S1 may be referred to as a first pixel 20, and the pixel included in the remaining areas excluding the first area S1 may be referred to as a second pixel 30.

As described above, the processor 140 may use the second light 2 to identify the distance between the object 200 positioned at a relatively far distance and the ToF sensor 100. Accordingly, the processor 140 may determine, based on the plurality of pixel values corresponding to the second pixel 30 included in the remaining areas corresponding to the object 200 which is positioned greater than or equal to the pre-set distance, the exposure time of the image sensor 130 for the second light 2 which is used to identify the object 200 positioned at a relatively far distance.

For example, the processor 140 may identify, based on the plurality of pixel values corresponding to each of the second pixels 30 included in the remaining areas from the first image frame 51, an average value of the intensity of first light 1 received by a plurality of second pixels 30 included in the remaining areas, and determine the exposure time of the image sensor 130 for the second light 2 based on the identified average value and a pre-set target brightness value.

Here, the pre-set target brightness value may be a target intensity value of reflected light received by the image sensor 130. In an example, the pre-set target brightness value may be set in a same value with respect to the first light and the second light 2.

In FIG. 6, values showing the intensity of light received by each of the pixels together with the distance values corresponding to each of the pixels have been shown. Here, the intensity of light corresponding to each of the pixels may be obtained based on a sum of the plurality of pixel values corresponding to each of the pixels as described in the above.

The processor 140 may identify the plurality of pixel values corresponding to each of the second pixels 30 included in the remaining areas, and identify the intensity of light corresponding to each of the second pixels 30 with the sum of the plurality of pixel values. Then, the processor 140 may identify the average value of the intensity of light received by the plurality of second pixels 30 included in the remaining areas.

Referring back to FIG. 6, the processor 140 may identify the respective intensity of light received by thirteen second pixels 30 included in the remaining areas excluding the twelve first pixels 20 included in the first area S1, and identify the average value of the intensity of light received by the thirteen second pixels 30 included in the remaining areas. At this time, the processor 140 may identify the average value of the intensity of light received by the thirteen second pixels 30 included in the remaining area as 8.

Then, the processor 140 may determine the exposure time of the image sensor 130 for the second light 2 based on the average value of the intensity of light received by the second pixels 30 and the pre-set target brightness value.

In an example, the processor 140 may determine the exposure time for the second light 2 based on the following Equation 2.

$$\text{Exposure time for the second light} = \Delta t_1 \times \alpha_1 \frac{I_1}{I_2} \qquad \text{[Equation 2]}$$

Here, $\Delta t_1$ represents the exposure time of the image sensor 130 set for the second light 2, I1 represents the pre-set target brightness value, I2 represents the average value of the intensity of light received by the second pixel 30, and $\alpha 1 \frac{I_1}{I_2}$ represents a first coefficient.

For example, the processor 140 may identify a ratio for the average value of the intensity of light received by the second pixels 30 of the pre-set target brightness value. Referring back to FIG. 6, if the pre-set target brightness value is 30, the ratio for the average value of the intensity of light received by the second pixels 30 of the pre-set target brightness value may be identified as 3.75 (the pre-set target brightness value/the average value of the intensity of light received by the second pixels 30=30/8). At this time, when the exposure time of the pre-set image sensor 130 for the second light 2 is 0.1 ns, the processor 140 may identify the exposure time of the image sensor 130 for the second light 2 which is output at the t2 time-point as 0.327 n s(0.1 ns×3.75).

The exposure time of the pre-set image sensor 130 for the second light 2 may be the exposure time for the previously applied second light 2. For example, in FIG. 5, if the exposure time of the image sensor 130 for the second light 2 output at the to time-point is $\Delta t_1$, the exposure time of the image sensor 130 for the second light 2 which is output at the t2 time-point may be determined based on $\Delta t_1$, the average value of the intensity of light received by the second pixel 30, and the pre-set target brightness value.

Then, the processor 140 may obtain, based on the second light 2 being output through the second light emitter 120, the second image frame 52 by receiving the second light 2 reflected by the plurality of objects 200 through the image sensor 130 based on the determined exposure time.

The processor 140 according to one or more embodiments of the disclosure may use the first image frame 51 and the second image frame 52 to determine the exposure time of the image sensor 130 for the first light 1. Here, the first image frame 51 may be an image frame obtained based on the first light 1 previously output through the first light emitter 110. Then, the second image frame 52 may be an image frame obtained by applying the exposure time of the image sensor 130 for the second light 2 determined by the first image frame 51.

For example, referring to FIG. 5, the processor 140 may use the second image frame 52 obtained based on the second light 2 output at t2 and the first image frame 51 obtained based on the first light 1 output at t1 in order to determine the exposure time of the image sensor 130 for the first light 1 output through the first light emitter 110 at t3.

The processor 140 may compare the first image frame 51 and the second image frame 52, and identify changes in distance between the ToF sensor 100 and the plurality of objects. In an example, the processor 140 may identify an average value of intensity of the first light 1 corresponding to the first image frame 51 based on the pixel value of the plurality of pixels 10 included in the first image frame 51, and identify an average value of intensity of the first light 1 corresponding to the second image frame 52 based on the pixel values of the plurality of pixels 10 included in the second image frame 52. At this time, the processor 140 may compare the average value of the intensity of first light 1 corresponding to the first image frame 51 and the average value of the intensity of second light 2 corresponding to the second image frame 52, and identify the changes in distance between the ToF sensor 100 and the plurality of objects.

At this time, the processor 140 may reduce, based on the distances between the ToF sensor 100 and the plurality of objects being identified as having become closer than the distance at the time of obtaining the first image frame 51, the exposure time for the pre-set first light 1. Then, the processor 140 may increase, based on the distances between the ToF sensor 100 and the plurality of objects being identified as having become closer than the distance at the time of obtaining the first image frame 51, the exposure time for the pre-set first light 1.

For example, referring back to FIG. 5, based on the identified distances between the ToF sensor 100 and the plurality of objects being identified as having become closer than the time-point at which the first light 1 is to be output at t1 based on the first image frame 51 obtained at t1 and the second image frame 52 obtained at t2, the processor 140 may determine the exposure time of the image sensor 130 for the first light 1 which is t output at t3 as a value smaller than the pre-set exposure time. According to another embodiment, based on the identified distances between the ToF sensor 100 and the plurality of objects being identified as having become farther than the time-point at which the first light 1 is to be output at t1 based on the first image frame 51 obtained at t1 and the second image frame 52 obtained at t2, the processor 140 may determine the exposure time of the image sensor 130 for the first output output at t3 as a value greater than the pre-set exposure time.

According to one or more embodiments of the disclosure, the processor 140 may identify the first area S1 from a first image, and identify changes in distance between the ToF sensor 100 and the plurality of objects based on the identified first area S1.

In an example, the processor 140 may identify the first area S1 corresponding to the object positioned less than the pre-set distance from the ToF sensor 100 from among the plurality of objects 200 in the first image frame 51 based on the plurality of pixel values included in the first image frame 51. In this respect, because the description of identifying the first area S1 from the first image frame 51 to determine the exposure time of the image sensor 130 for the above-described second light 2 can be identically applied, detailed descriptions thereof will be omitted.

Then, the processor 140 may identify an area corresponding to the object 200 positioned less than the pre-set distance from the ToF sensor 100 from among the plurality of objects 200 in the second image frame 52 based on the plurality of pixel values included in the second image frame 52. The object 200 which is identified such that the distance with the ToF sensor 100 is less than the pre-set distance from among the plurality of objects 200 in the second image frame 52 may be same as with the object which is identified such that the distance with the ToF sensor 100 is less than the pre-set distance from among the plurality of objects 200 identified in the first image frame 51.

The processor 140 may identify, based on the plurality of pixel values included in the second image frame 52, a second area S2 corresponding to a pixel having a saturated pixel value in the second image frame 52. For example, the processor 140 may select, based on the second image frame 52 being obtained by applying the determined exposure time of the image sensor 130 for the second light 2 to the first image frame 51, at least one pixel having a saturated pixel value from among the plurality of pixels 10 included in the second image frame 52.

Here, the pixel having the saturated pixel value may be a pixel accumulated with a maximum electric charge amount that can be accumulated in the receptor included in the pixel due to a long exposure time of the image sensor 130 for the second light 2 determined based on the first image frame 51. In an example, the pixel having the saturated pixel value may be a pixel including at least one receptor in which the maximum electric charge amount is accumulated from among the plurality of receptors.

The processor 140 may select at least one pixel having the saturated pixel value from among the plurality of pixels 10 included in the second image frame 52, and identify the area in which the selected at least one pixel is included as the second area S2. For convenience of description, the pixel having the saturated pixel value may be referred to as a third pixel 40 below.

In an example, referring to FIG. 7, if the saturated pixel value is 30, the processor 140 may select nine third pixels 40 having the pixel value of 30 from among the plurality of pixels 10 included in the second image frame 52. At this time, the processor 140 may identify the area in which the selected nine third pixels 40 are included as the second area S2. For example, in FIG. 6, the processor 140 may identify the shadow processed area including the nine third pixels 40 as the second area S2.

A pixel which did not obtain a pixel value from among the plurality of pixels may be present in the second image frame obtained based on the second light. In the case of the second light, because the second light has a dot form (i.e., spot form) unlike the first light which has a surface form (i.e., flood form), there may be a pixel that did not receive the second light reflected by an object from among the plurality of pixels.

In this case, the processor may select the third pixel 40 having the saturated pixel value from among the pixels that obtained the plurality of pixel values by receiving the second light reflected by the object, and identify the position of the selected third pixel 40 in the image sensor. Then, the processor may extract linear components using various linear detection algorithms (e.g., Hough transform, HoughLines function, etc.) at the position of the third pixel 40 selected in the image sensor, and identify the second area based on the extracted linear components.

Further, the processor 140 may determine the exposure time of the image sensor 130 for the first light 1 based on the sizes of the first area S1 and the second area S2. For example, the processor 140 may compare the sizes of the first area S1 and the second area S2, and identify the changes in distance between the plurality of objects 200 and the ToF sensor 100 based on the comparison result.

For example, the processor 140 may identify, by comparing the sizes of the first area S1 and the second area S2, the change in distance between an object, the distance of which with the ToF sensor 100 being less than the pre-set distance from among the plurality of objects 200, and the ToF sensor 100.

At this time, the processor 140 may identify, based on the size of the first area S1 being smaller than the size of the second area S2, as the distances between the plurality of objects 200 and the ToF sensor 100 having become farther apart. Accordingly, the processor 140 may determine the exposure time of the image sensor 130 for the first light 1 to be output thereafter as a value greater than the pre-set exposure time.

In addition, the processor 140 may identify, based on the size of the first area S1 being greater than the size of the second area S2, as the distances between the plurality of objects 200 and the ToF sensor 100 having become closer. Accordingly, the processor 140 may determine the exposure time of the image sensor 130 for the first light 1 to be output thereafter as a value smaller than the pre-set exposure time.

The exposure time for the pre-set first light 1 may be the exposure time of the image sensor 130 set for the first light 1 which was previously output. Accordingly, the processor 140 may determine, based on the size of the first area S1 being smaller than the size of the second area S2, the exposure time of the image sensor 130 for the first light 1 as a value smaller than the previous exposure time for the first light 1. Then, the processor 140 may determine, based on the size of the first area S1 being greater than the size of the second area S2, the exposure time of the image sensor 130 for the first light 1 as a value greater than the previous exposure time for the first light 1.

For example, referring to FIG. 8, the processor 140 may compare the size of the first area S1 identified from the first image frame 51 obtained at the t1 time-point and the size of the second area S2 identified from the second image frame 52 obtained at the t2 time-point. At this time, when the size of the second area S2 identified from the second image frame 52 obtained at the t2 time-point is identified as smaller than the size of the first area S1, the processor 140 may identify as the distance between the ToF sensor 100 and the object having become farther apart.

Accordingly, when the first light 1 is output again at a time-point (e.g., t3) after t2, the intensity of the first light 1 reflected by the object 200 positioned at a distance that has become farther from the ToF sensor 100 may be relatively weaker than at the t1 time-point. Accordingly, the processor 140 may determine, based on the distance between the ToF sensor 100 and the object being identified as having become farther part, the exposure time of the image sensor 130 for the first light 1 which is output at t3 as a value greater than the exposure time set for the first light 1 at the t1 time-point.

In addition, referring to FIG. 9, the processor 140 may identify, based on the size of the second area S2 identified from the second image frame 52 obtained at the t2 time-point being identified as greater than the size of the first area S1, as the distance between the ToF sensor 100 and the object having become closer.

Accordingly, when the first light 1 is output again at a time-point (e.g., t3) after t2, the intensity of the first light 1 reflected by the object 200 positioned at a closer distance from the ToF sensor 100 may be relatively stronger than at the t1 time-point. Accordingly, when a same exposure time as the exposure time applied at t1 is applied at t3, the third pixel 40 having the saturated pixel value from among the plurality of pixels 10 in the image sensor 130 may be generated. Accordingly, the processor 140 may determine, based on the distance between the ToF sensor 100 and the object being identified as having become farther apart, the exposure time of the image sensor 130 for the first light 1 which is output at t3 as a value smaller than the exposure time set for the first light 1 at the t1 time-point.

The processor may determine the exposure time for the first light through the following Equation 3.

$$\text{Exposure time for the first light} = \Delta_{t2} \times (S_1 + \alpha_2(S_2 - S_1)) \quad \text{[Equation 3]}$$

Here, Δt2 represents the exposure time of the image sensor 130 set for the first light 1, S1 represents the size of the first area, S2 represents the size of the second area, and α2 represents a second coefficient.

According to another embodiment, the processor 140 may determine the exposure time for the first light through the following Equation 4.

$$\text{Exposure time for the first light} = \Delta t_2 \times \alpha_3 \frac{S_1}{S_2} \quad \text{[Equation 4]}$$

Here, Δt2 represents the exposure time of the image sensor 130 set for the first light 1, S1 represents the size of the first area, S2 represents the size of the second area, and α3 represents a third coefficient.

The processor 140 may receive, based on the first light 1 being output through the first light emitter 110, the first light 1 reflected by the plurality of objects 200 through the image sensor 130 based on the determined exposure time, and obtain the first image frame 51.

For example, referring back to FIG. 5, the processor 140 may apply the exposure time determined based on the first image frame 51 obtained at the t1 time-point and the second image frame 52 obtained at the t2 time-point to the image sensor 130 and receive the first light 1 reflected by the object 200 after being output at t3. Then, the processor 140 may obtain the first image frame 51 corresponding to the first light 1 output at t3.

At this time, the first image frame 51 obtained at t3 may be used in determining the exposure time for the second light 2 which is output at a time-point (e.g., t4) thereafter.

The processor 140 according to one or more embodiments of the disclosure may identify the distance between the object 200, the distance of which with the ToF sensor 100 being less than the pre-set distance from among the plurality of objects 200, and the ToF sensor 100 based on the plurality of pixel values included in the first image frame 51. Then, the processor 140 may identify the distance between the object, the distance of which with the ToF sensor 100 being greater than or equal to the pre-set distance from among the plurality of objects 200, and the ToF sensor 100 based on the plurality of pixel values included in the second image frame 52.

For example, the processor 140 may identify the distance between the object 200 and the ToF sensor 100 based on the distance value corresponding to at least one first pixel 20 included in the first area S1 identified from the first image frame 51 based on the first image frame 51.

For example, the at least one first pixel 20 included in the first area S1 may correspond to the object 200 positioned within the pre-set distance from the ToF sensor 100 from among the plurality of objects 200. Accordingly, the processor 140 may identify the distance with the object 200 positioned within the pre-set distance from the ToF sensor 100 from among the plurality of objects 200 and with the ToF sensor 100 based on the distance value (For example, the distance value identified based on the plurality of pixel values corresponding to the first pixel 20) of the first pixel 20.

In addition, the processor 140 may identify the distance between the object 200 and the ToF sensor 100 based on a distance value corresponding to the at least one pixel included in the remaining areas other than the second area S2 identified from the second image frame 52 based on the second image frame 52. The at least one pixel included in the remaining areas other than the second area S2 in the second image frame 52 may correspond to the object 200 positioned outside the pre-set distance from the ToF sensor 100 from among the plurality of objects 200.

For example, the processor 140 may select the remaining pixels excluding the at least one third pixel 40 having the saturated pixel value from among the plurality of pixels 10. Then, the processor 140 may identify the distance with the object 200 positioned outside the pre-set distance from the ToF sensor 100 from among the plurality of objects 200 and with the ToF sensor 100 based on the distance values of the selected remaining pixels (For example, the distance values identified based on the plurality of pixel values that correspond to the remaining pixels excluding the third pixel 40 included in the second area S2 from among the plurality of pixels 10).

A method for controlling the ToF sensor 100 according to one or more embodiments of the disclosure will be described below.

Figure 10:
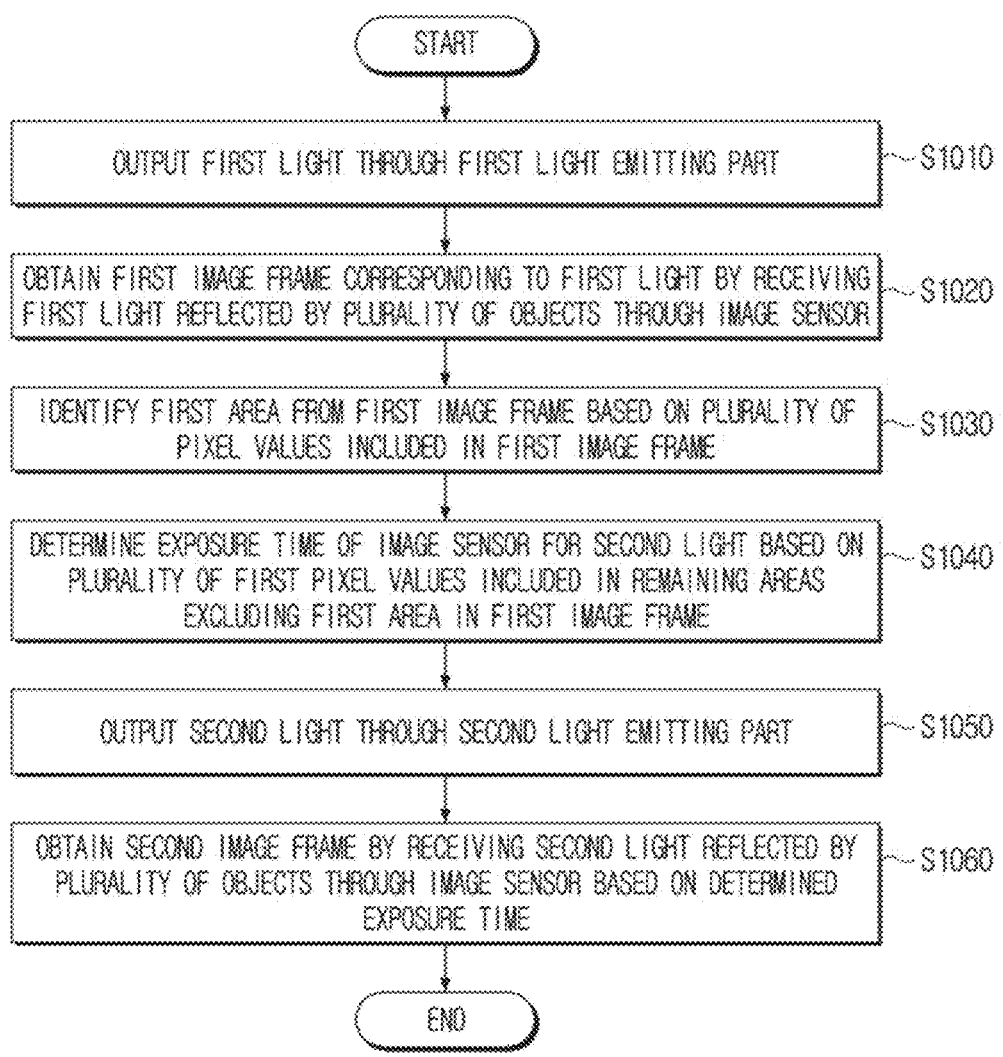
FIGS. 10 and 11 are flowcharts illustrating a method for controlling a ToF sensor according to one or more embodiments of the disclosure.
Figure 11:
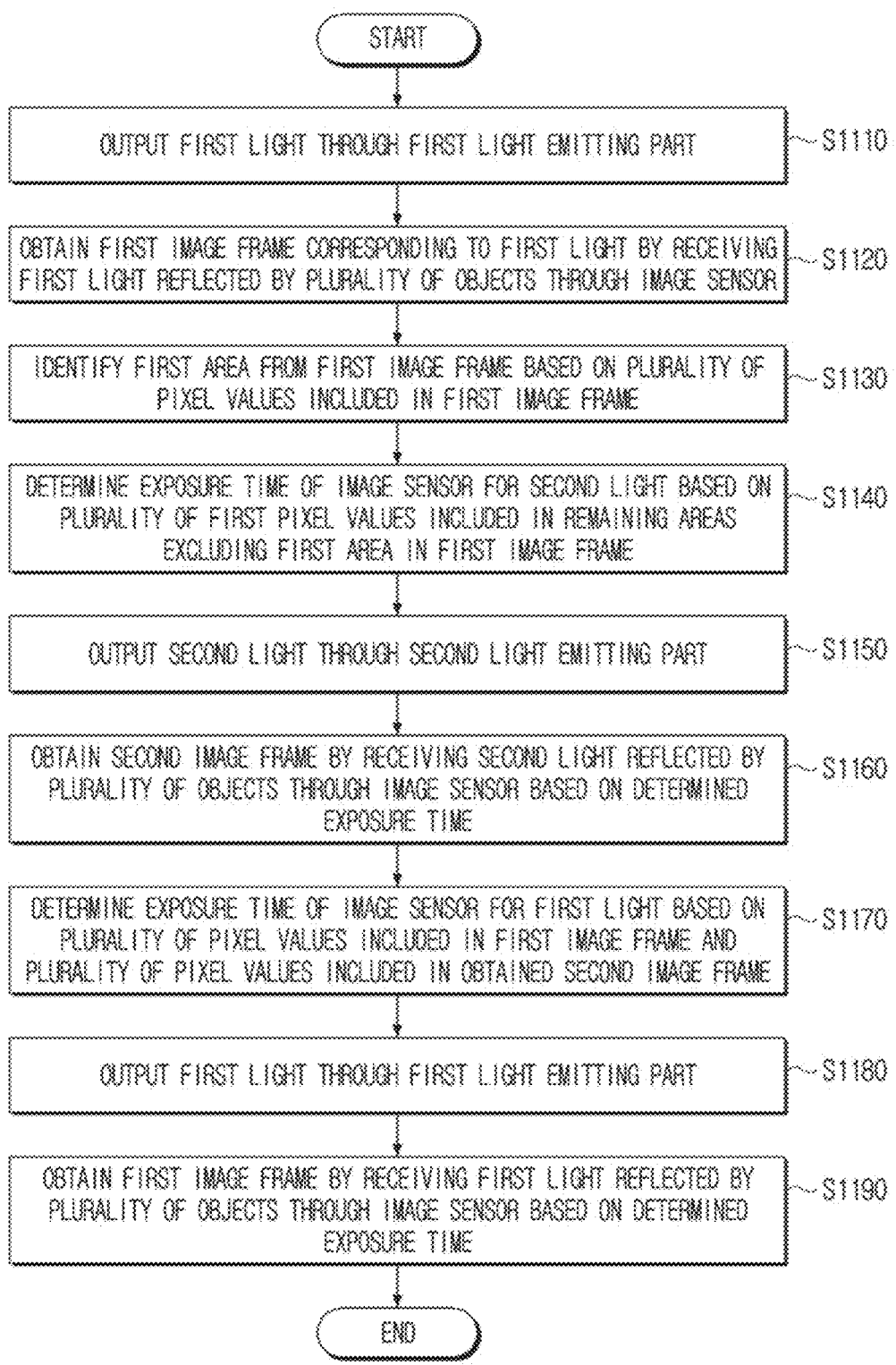

FIGS. 10 and 11 are flowcharts schematically illustrating a method for controlling a ToF sensor according to one or more embodiments of the disclosure.

When the method for controlling the ToF sensor 100 according to one or more embodiments of the disclosure is performed by the processor 140, the processor 140 may sequentially output the first light 1 of the first pattern which is generated through the first light emitter 110 and the second light 2 of the second pattern which is generated through the second light emitter 120, receive the first light 1 and the second light 2 reflected by the plurality of objects through the image sensor 130, and obtain the first image frame 51 corresponding to the first light 1 and the second image frame 52 corresponding to the second light.

Then, the processor 140 may identify the distances between the ToF sensor 100 and the plurality of objects based on the first image frame 51 and the second image frame 52.

At this time, the processor 140 may identify the distance between the object, the distance of which with the ToF sensor 100 is less than the pre-set distance from among the plurality of objects, and the ToF sensor 100 based on the plurality of pixel values included in the first image frame 51. Then, the processor 140 may identify the distance between the object, the distance of which with the ToF sensor 100 is greater than or equal to the pre-set distance, and the ToF sensor 100 based on the plurality of pixel values included in the second image frame 52.

The processor 140 according to one or more embodiments of the disclosure as described above may obtain the first image frame 51 and the second image frame 52, respectively, by alternating the first light 1 and the second light 2. At this time, the processor 140 according to one or more embodiments of the disclosure may determine the exposure time of the image sensor 130 for the second image frame 52 based on the first image frame 51. According to another embodiment, the processor 140 may determine the exposure time of the image sensor 130 for the first image frame 51 based on the second image frame 52. Here, the exposure time may be time the image sensor 130 is exposed to receive the reflected light.

For example, referring to FIG. 10, the processor 140 may output the first light 1 through the first light emitter 110 (S1010). Then, the processor 140 may receive the first light 1 reflected by the plurality of objects through the image sensor 130, and obtain the first image frame 51 corresponding to the first light 1 (S1020).

Then, the processor 140 may identify the first area S1 corresponding to an object, the distance of which with the ToF sensor 100 is less than the pre-set distance from among the plurality of objects in the first image frame 51 based on the plurality of pixel values included in the first image frame 51 (S1030).

For example, the processor 140 may obtain the distance values corresponding to each of the pixels of the image sensor 130 based on each of the pixel values included in the first image frame 51. Then, the processor 140 may identify the first area S1 corresponding to the object from the first image frame 51 based on the obtained distance value.

Then, the processor 140 may determine the exposure time of the image sensor 130 for the second light 2 based on the plurality of first pixel values included in the remaining areas excluding the first area S1 in the first image frame 51 (S1040).

At this time, the processor 140 may identify the average value of the plurality of pixel values included in the remaining areas in the first image frame 51, and determine the exposure time of the image sensor 130 for the second light 2 based on the identified average value and the pre-set target brightness value.

When the exposure time of the image sensor 130 for the second light 2 is determined, the processor 140 may output the second light 2 through the second light emitter 120 (S1050).

Then, the processor 140 may receive the second light 2 reflected by the plurality of objects through the image sensor 130 based on the determined exposure time, and obtain the second image frame 52 (S1060).

Referring to FIG. 11, steps S1110 to S1160 shown in FIG. 11 may correspond with steps S1010 to S1060 shown in FIG. 10. Accordingly, descriptions thereof will be omitted.

Referring to FIG. 11, the processor 140 may determine the exposure time of the image sensor 130 for the first light 1 based on the plurality of pixel values included in the first image frame 51 and the plurality of pixel values included in the second image frame 52 obtained based on the determined exposure time after obtaining the second image frame 52 (S1170).

For example, the processor 140 may identify the second area S2 having the saturated pixel value in the second image frame 52 based on the plurality of pixel values included in the second image frame 52. Then, the processor 140 may determine the exposure time of the image sensor 130 for the first light 1 based on the sizes of the first area S1 and the second area S2.

For example, the processor 140 may determine, based on the size of the first area S1 being smaller than the size of the second area S2, the exposure time of the image sensor 130 for the first light 1 as a value smaller than the previous exposure time for the first light. In addition, the processor 140 may determine, based on the size of the first area S1 being greater than the size of the second area S2, the exposure time of the image sensor 130 for the first light 1 as a value greater than the previous exposure time for the first light 1.

Then, the processor 140 may receive, based on the first light 1 being output through the first light emitter 110, the first light 1 reflected by the plurality of objects through the image sensor 130 through the determined exposure time, and obtain the first image frame 51 (S1180).

In the above described description, steps S1010 to S1060 and steps S1110 to S1180 may be divided into additional steps, or combined with more smaller steps according to one or more embodiments of the disclosure. In addition, some steps may be omitted according to necessity, and the order between the steps may be changed.

Figure 12:
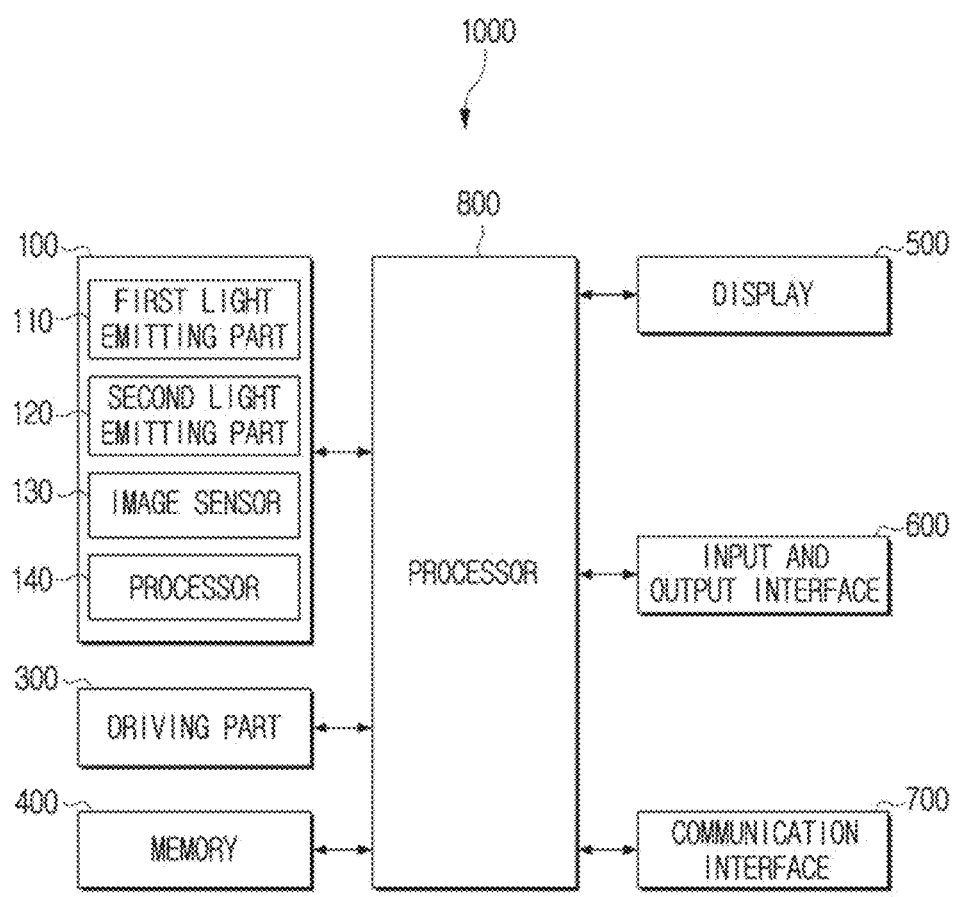
FIG. 12 is a block diagram of a robot including a ToF sensor of the disclosure.

FIG. 12 is a block diagram of a robot including a ToF sensor of the disclosure.

According to one or more embodiments of the disclosure, the ToF sensor 100 may be included in a robot 1000. Through the ToF sensor 100, the robot 1000 may detect the object 200 at a vicinity of the robot 1000, and identify a distance between the detected object 200 and the robot 1000.

According to one or more embodiments of the disclosure, the robot 1000 may include the ToF sensor 100, a driving part 300, a memory 400, a display 500, an input and output interface 600, a communication interface 700, and a processor 800.

The driving part 300 may be an element for moving the robot 1000. The driving part 300 may be implemented as a wheel, legs of the robot 1000, or the like. To this end, the driving part 300 may include a motor.

The memory 400 may store data necessary for the various embodiments on the ToF sensor 100 of the disclosure or various data used in driving the robot 1000. The memory 400 may be implemented in a form of the memory 400 embedded in the robot 1000 according to a data storage use, or in the form of the memory 400 attachable to or detachable from the robot 1000. For example, the data for the driving of the robot 1000 may be stored in the memory 400 embedded to the robot 1000, and data for an expansion function of the robot 1000 may be stored in the memory 400 attachable to or detachable from the robot 1000.

The memory 400 embedded in the robot 1000 may be implemented as at least one of a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)).

In addition, in the case of the memory 400 attachable to or detachable from the robot 1000, the memory 400 may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a universal serial bus (USB) port, or the like.

The display 500 may display various visual information. For example, the display 500 may display travel route information, and the like of the robot 1000. The display 500 may be implemented as a display of various forms such as, for example and without limitation, a liquid crystal display (LCD), an organic light emitting diode (OLED) display, a quantum dot light-emitting diode (QLED) display, a plasma display panel (PDP), and the like. In the display 500, a driving circuit, which may be implemented in the form of an a-si thin film transistor (TFT), a low temperature poly silicon (LTPS) TFT, an organic TFT (OTFT), or the like, a backlight unit, and the like may be included. The display 500 may be implemented as a flexible display, a three-dimensional display (3D display), or the like.

The input and output interface 600 may be a configuration of the robot 1000 which is used in performing interactions with a user, and the processor 800 may receive input of various information about a travel space through the input and output interface 600. The input and output interface 600 may include at least one from among a touch sensor, a motion sensor, a button, a Jog dial, a switch, or a speaker, but is not limited thereto.

The communication interface 700 may input and output data of various types. For example, the communication interface 700 may transmit and receive data of various types with an external device (e.g., source device), an external storage medium (e.g., USB memory), and an external server (e.g., WEBHARD) through a communication method such as, for example, and without limitation, Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

The processor 800 may control the overall operation of the robot 1000. To this end, the processor 800 may be connected with the ToF sensor 100 and obtain distance information between the robot 1000 and the object 200 based on the pixel value obtained from the ToF sensor 100. Alternatively, the processor 800 may control the driving part 300 and control various traveling operations such as, for example, and without limitation, moving, stopping, controlling speed, changing directions, and the like of the robot 1000.

The methods according to the various embodiments described above may be implemented in an application form installable in a sensor or a robot of the related art. According to another embodiment, the methods according to the various embodiments described above may be performed by using a deep learning based trained neural network (or a deep trained neural network), For example, a learning network model. In addition, the methods according to the various embodiments described above may be implemented with only a software upgrade for the sensor or robot of the related art, or a hardware upgrade. In addition, the various embodiments of the disclosure described above may be performed through a sensor, or an embedded server included in the robot, or through an external server of the robot.

One or more various embodiments described in the above may be implemented with software including instructions stored in a machine-readable storage media (e.g., computer). The machine may call an instruction stored in the storage medium, and as a device operable according to the called instruction, may include a display device (e.g., display device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be stored at least temporarily in the storage medium such as a server of a manufacturer, a server of an application store, or a memory of a relay server, or temporarily generated.

In addition, each of the elements (e.g., a module or a program) according to various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While embodiments have been described with reference to the figures, it will be understood by those of ordinary skill in the art that various changes in form and details may be made therein without departing from the spirit and scope as defined by the following claims and their equivalents.

What is claimed is:

1. A time of flight (ToF) sensor comprising:
a first light emitter configured to output first light having a first pattern;
a second light emitter configured to output second light having a second pattern;
an image sensor comprising a plurality of pixels; and
at least one processor configured to:
control the first light emitter and the second light emitter to sequentially output the first light and the second light,
obtain, based on the output first light and the output second light being received through the image sensor by being reflected by a plurality of objects, a first image frame corresponding to the received first light and a second image frame corresponding to the received second light,
identify distances between the ToF sensor and the plurality of objects based on the first image frame and the second image frame,
identify, based on a plurality of pixel values included in the first image frame, a first area corresponding to an object from among the plurality of objects in the first image frame, a first distance between the object and the ToF sensor being less than a pre-set distance,
determine an exposure time of the image sensor for the second light based on a plurality of first pixel values included in remaining areas excluding the first area in the first image frame, and
obtain, based on the second light being output through the second light emitter, the second image frame by receiving the second light reflected by the plurality of objects through the image sensor based on the exposure time.

2. The ToF sensor of claim 1, wherein the at least one processor is further configured to:
identify the first distance between the object and the ToF sensor based on the plurality of pixel values included in the first image frame, and
identify a second distance between an object from among the plurality of objects, and the ToF sensor based on the plurality of pixel values included in the second image frame, the second distance being greater than or equal to the pre-set distance.

3. The ToF sensor of claim 1, wherein the at least one processor is further configured to:
obtain distance values corresponding to each of the plurality of pixels of the image sensor based on each of the plurality of pixel values included in the first image frame, and
identify the first area corresponding to the object from the first image frame based on the distance values.

4. The ToF sensor of claim 3, wherein the at least one processor is further configured to:
identify an average value of the plurality of pixel values included in the remaining areas in the first image frame, and determine the exposure time of the image sensor for the second light based on the identified average value and a pre-set target brightness value.

5. The ToF sensor of claim 1, wherein the at least one processor is further configured to:
determine an exposure time of the image sensor for the first light based on the plurality of pixel values included in the second image frame obtained based on the plurality of pixel values included in the first image frame and the exposure time, and
obtain, based on the first light being output through the first light emitter, the first image frame by receiving the first light reflected by the plurality of objects through the image sensor based on the exposure time.

6. The ToF sensor of claim 5, wherein the at least one processor is further configured to:
identify a second area having a saturated pixel value from the second image frame based on the plurality of pixel values included in the second image frame, and determine the exposure time of the image sensor for the first light based on sizes of the first area and the second area.

7. The ToF sensor of claim 6, wherein the at least one processor is further configured to:
determine, based on a size of the first area being smaller than a size of the second area, the exposure time of the image sensor for the first light as a value smaller than a previous exposure time for the first light, and
determine, based on the size of the first area being greater than the size of the second area, the exposure time of the image sensor for the first light as a value greater than the previous exposure time for the first light.

8. A method for controlling a time of flight (ToF) sensor, the method comprising:
sequentially outputting a first light of a first pattern which is generated through a first light emitter and a second light of a second pattern which is generated through a second light emitter,
obtaining a first image frame corresponding to the first light and a second image frame corresponding to the second light by receiving the first light and the second light reflected by a plurality of objects through an image sensor; and
identifying distances between the ToF sensor and the plurality of objects based on the first image frame and the second image frame,
wherein the obtaining the first image frame and the second image frame comprises:
outputting the first light through the first light emitter;
obtaining the first image frame corresponding to the first light by receiving the first light reflected by the plurality of objects through the image sensor;
identifying a first area corresponding to an object from among the plurality of objects in the first image frame based on a plurality of pixel values included in the first image frame, a first distance between the object and the ToF sensor being less than a pre-set distance;
determining an exposure time of the image sensor for the second light based on a plurality of first pixel values included in remaining areas excluding the first area in the first image frame;
outputting the second light through the second light emitter; and
obtaining the second image frame by receiving the second light reflected by the plurality of objects through the image sensor based on the exposure time.

9. The method of claim 8, wherein the identifying distances between the ToF sensor and the plurality of objects comprises:
identifying the first distance between the object and the ToF sensor based on the plurality of pixel values included in the first image frame, and
identifying a second distance between an object and the ToF sensor based on a plurality of pixel values included in the second image frame, the second distance being greater than or equal to the pre-set distance from among the plurality of objects.

10. The method of claim 8, wherein the identifying the first area comprises:
obtaining distance values corresponding to each of the pixels of the image sensor based on each of the plurality of pixel values included in the first image frame; and
identifying the first area corresponding to the object in the first image frame based on the distance values.

11. The method of claim 10, wherein the determining the exposure time of the image sensor for the second light comprises:
identifying an average value of the plurality of pixel values included in the remaining areas in the first image frame, and
determining the exposure time of the image sensor for the second light based on the average value and a pre-set target brightness value.

12. The method of claim 8, further comprising:
determining the exposure time of the image sensor for the first light based on the plurality of pixel values included in the second image frame obtained based on the plurality of pixel values included in the first image frame and the exposure time; and
obtaining, based on the first light being output through the first light emitter, the first image frame by receiving the first light reflected by the plurality of objects through the image sensor based on the exposure time.

13. The method of claim 12, further comprising:
identifying a second area having a saturated pixel value in the second image frame based on the plurality of pixel values included in the second image frame; and
determining the exposure time of the image sensor for the first light based on sizes of the first area and the second area.

14. The method of claim 13, wherein the determining the exposure time of the image sensor for the first light comprises:
determining, based on a size of the first area being smaller than a size of the second area, the exposure time of the image sensor for the first light as a value smaller than a previous exposure time for the first light, and
determining, based on the size of the first area being greater than the size of the second area, the exposure time of the image sensor for the first light as a value greater than the previous exposure time for the first light.

* * * * *